United States Patent
Seo et al.

(10) Patent No.: US 9,703,412 B2
(45) Date of Patent: Jul. 11, 2017

(54) MULTIMEDIA DEVICE FOR HAVING TOUCH SENSOR AND METHOD FOR CONTROLLING THE SAME

(71) Applicant: LG ELECTRONICS INC., Seoul (KR)

(72) Inventors: Bokil Seo, Seoul (KR); Younghwan Kim, Seoul (KR); Jaehun Lee, Seoul (KR); Manho Lee, Seoul (KR); Eunsuk Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/082,467

(22) Filed: Nov. 18, 2013

(65) Prior Publication Data
US 2014/0139463 A1    May 22, 2014

(30) Foreign Application Priority Data

Nov. 21, 2012  (KR) .................. 10-2012-0132232
Jan. 14, 2013  (KR) .................. 10-2013-0003982

(51) Int. Cl.
*G06F 3/041*   (2006.01)
*G06F 3/044*   (2006.01)
(Continued)

(52) U.S. Cl.
CPC ............ *G06F 3/0416* (2013.01); *G06F 3/017* (2013.01); *G06F 3/044* (2013.01); *G06F 3/0414* (2013.01);
(Continued)

(58) Field of Classification Search
CPC ........... G06F 2203/04101; G06F 3/044; G06F 3/0416; G06F 2203/04104; G06F 3/041;
(Continued)

(56) References Cited

U.S. PATENT DOCUMENTS 6,144,366 A * 11/2000 Numazaki ............... G06F 3/011
345/156
6,323,846 B1 * 11/2001 Westerman ........... G06F 3/0235
345/173
(Continued)

FOREIGN PATENT DOCUMENTS

JP   WO 2014128789 A1 *  8/2014   ............... G06K 9/48
KR   10-2010-0096424 A      9/2010

OTHER PUBLICATIONS

Aoyama et al, "A Study of a Palmprint Region Extraction Algorithm for Touchless Palmprint Recognition", SCIS 2011, Jan. 2011, pp. 1-7.*

(Continued)

*Primary Examiner* — Julie Anne Watko
(74) *Attorney, Agent, or Firm* — Ked & Associates, LLP

(57) ABSTRACT

A multimedia device and a method for controlling the same are disclosed. A method for controlling a multimedia device, which includes an area based touch sensor, comprises the steps of recognizing at least one of a palm and a finger of a user through a touch sensor; determining at least one of a shape and a size of a touched area in accordance with the recognized result of the touch sensor; accessing a specific function stored in a memory module in accordance with the determined result; and outputting at least one of video data and audio data corresponding to the accessed specific function, wherein the determining step includes detecting the touched area and deciding whether the current touched area is a palm, on the basis of the detected touched area.

10 Claims, 29 Drawing Sheets

< Sine conversion >

(51) Int. Cl.
*G06F 3/0488* (2013.01)
*G06F 3/01* (2006.01)

(52) U.S. Cl.
CPC .. *G06F 3/0488* (2013.01); *G06F 2203/04104* (2013.01); *G06F 2203/04803* (2013.01); *G06F 2203/04808* (2013.01)

(58) Field of Classification Search
CPC ................ G06F 3/0488; G06F 3/017; G06F 2203/04808; G06F 3/04883; G06F 2203/04803
USPC ......................................................... 345/173
See application file for complete search history.

(56) References Cited

U.S. PATENT DOCUMENTS

| | | | | |
|---|---|---|---|---|
| 6,624,833 | B1* | 9/2003 | Kumar | G06F 3/017 345/156 |
| 8,854,321 | B2* | 10/2014 | Xia | G06F 3/0334 345/173 |
| 8,994,674 | B2* | 3/2015 | Eguchi | G06F 3/04883 345/173 |
| 9,007,314 | B2* | 4/2015 | Liu | G06F 3/041 178/18.03 |
| 9,261,964 | B2* | 2/2016 | Townsend | G06F 3/0416 |
| 9,348,477 | B2* | 5/2016 | Reynolds | G06F 3/041 |
| 9,448,620 | B2* | 9/2016 | Kim | G06F 3/005 |
| 2006/0244735 | A1* | 11/2006 | Wilson | G06F 3/0488 345/173 |
| 2006/0267967 | A1* | 11/2006 | Hinckley | G06F 3/04883 345/179 |
| 2009/0109183 | A1* | 4/2009 | Carvajal | G06F 3/0416 345/173 |
| 2009/0228841 | A1 | 9/2009 | Hildreth | 715/863 |
| 2010/0026649 | A1 | 2/2010 | Shimizu et al. | 345/173 |
| 2010/0211920 | A1* | 8/2010 | Westerman | G06F 3/04883 715/863 |
| 2010/0306649 | A1 | 12/2010 | Russ et al. | 715/702 |
| 2011/0148770 | A1* | 6/2011 | Adamson | G06F 3/04883 345/173 |
| 2011/0248941 | A1* | 10/2011 | Abdo | G06F 3/0488 345/173 |
| 2012/0154447 | A1 | 6/2012 | Kim et al. | 345/661 |
| 2012/0206584 | A1* | 8/2012 | Serizawa | G06F 3/0416 348/77 |
| 2013/0057469 | A1* | 3/2013 | Ajika | G06F 3/017 345/156 |
| 2013/0063385 | A1* | 3/2013 | Nishio | G06F 1/1626 345/173 |
| 2013/0074000 | A1* | 3/2013 | Liu | G06F 3/04883 715/781 |
| 2013/0106776 | A1* | 5/2013 | Park | G06F 3/04883 345/174 |
| 2013/0201118 | A1* | 8/2013 | Liu | G06F 3/0416 345/173 |
| 2013/0234982 | A1* | 9/2013 | Kang | G06F 3/0488 345/174 |
| 2014/0351768 | A1* | 11/2014 | Park | G06F 3/0488 715/856 |
| 2014/0368455 | A1* | 12/2014 | Croisonnier | G06F 3/0414 345/173 |
| 2015/0117708 | A1* | 4/2015 | Guigues | G06T 7/0042 382/103 |
| 2015/0309610 | A1* | 10/2015 | Rabii | G06F 3/044 345/174 |
| 2016/0004907 | A1* | 1/2016 | Lundberg | G06K 9/48 348/53 |
| 2016/0004908 | A1* | 1/2016 | Lundberg | G06K 9/48 382/103 |
| 2016/0364009 | A1* | 12/2016 | Lemberger | G06F 3/017 |
| 2016/0364137 | A1* | 12/2016 | Ren | G06F 3/04886 |
| 2016/0364138 | A1* | 12/2016 | Luo | G06F 3/04886 |

OTHER PUBLICATIONS

Inoue et al, "A Study on Finger Character Recognition using Kinect", IEICE Technical Report MBE2012-81 (Jan. 2013), pp. 45-50.*
Malassiotis et al. "Real-time hand posture recogniation using range data." Image and Vision Computing 26 (Science Direct Jul. 2008) 1027-1037.*
Trigo et al. "An Analysis of Features for Hand-Gesture Classification." 17th International Conference on Systems, Signals and image processing (Jun. 2010) p. 412-415.*
Bhuyan et al. "Fingertip Detection for Hand Pose Recognition." IJCSE v. 4 No. 03, p. 501-511 (Mar. 2012).*
Palacios et al. "Human-Computer Interaction Base on Hand Gestures Using RGB-D Sensors." Sensors (Sep. 2013) 13, 11842-11860.*
Mihalache et al. "Hand pose estimation using HOG features from RGB-D data." IEEE (2013) 978-1-4799-2228-4/13.*
International Search Report dated Nov. 27, 2013 issued in Application No. PCT/KR2013/007072.

* cited by examiner

< increasing     < decreasing     < upward         < downward
transition >     transition >     inflection >     inflection >

< Merge algorithm >

FIG. 12 white space count = Count ( find ( OffNode ) )

$$T = \sum_{j=0}^{N-1} Top(j), \quad L = \sum_{i=0}^{M-1} Left(i), \quad R = \sum_{i=0}^{M-1} Right(i), \quad B = \sum_{j=0}^{N-1} Bottom(j)$$

if ( white space count > $\frac{Length(T) \times Length(L)}{2}$ ) object is palm else if ( $|(T+L)-(B+R)|$ $\frac{Length(T) \times Length(L)}{2}$ ) object is palm else if ( $|(T+R)-(B+L)|$ $\frac{Length(T) \times Length(R)}{2}$ ) object is palm else Object is Finger Start point < Sine conversion >

| Index | coordinate |
|---|---|
| 1 | ( 0, 0 ) |
| 2 | ( 0, 1 ) |
| 3 | ( 0, 2 ) |
| 4 | ( 0, 3 ) |
| 5 | ( 0, 4 ) |
| 6 | ( 0, 5 ) |
| 7 | ( 0, 6 ) |
| ⋮ | ⋮ |
| 112 | ( 185, 306 ) |
| 113 | ( 301, 273 ) |
| 217 | ( 427, 431 ) |
| 257 | ( 138, 443 ) |
| 258 | ( 229, 462 ) |
| 275 | ( 248, 672 ) |
| 278 | ( 349, 730 ) |
| ⋮ | ⋮ |

FIG. 30

| Time | Type | Code | Value | |
|---|---|---|---|---|
| Time | EV_ABS | ABS_MT_POSITON_X | value | finger touch data |
| Time | EV_ABS | ABS_MT_POSITON_Y | value | |
| Time | EV_ABS | ABS_MT_PRESSURE | value | |
| Time | EV_ABS | ABS_MT_WIDTH_MAJOR | value | |
| Time | EV_ABS | ABS_MT_WIDTH_MINOR | value | |
| Time | EV_ABS | ABS_MT_TRACKING_ID | value | |
| Time | EV_SYN | SYN_MT_REPORT | value | |
| Time | EV_ABS | ABS_MT_PALM_AREA | N | area based touch data |
| Shape data | | | | |
| ...... | | | | |
| Shape data | | | | |
| Time | EV_SYN | SYN_MT_REPORT | value | |
| Time | EV_SYN | MT_REPORT | value | |

3130  3120  3110

(a)  (a)

(a)  (a)

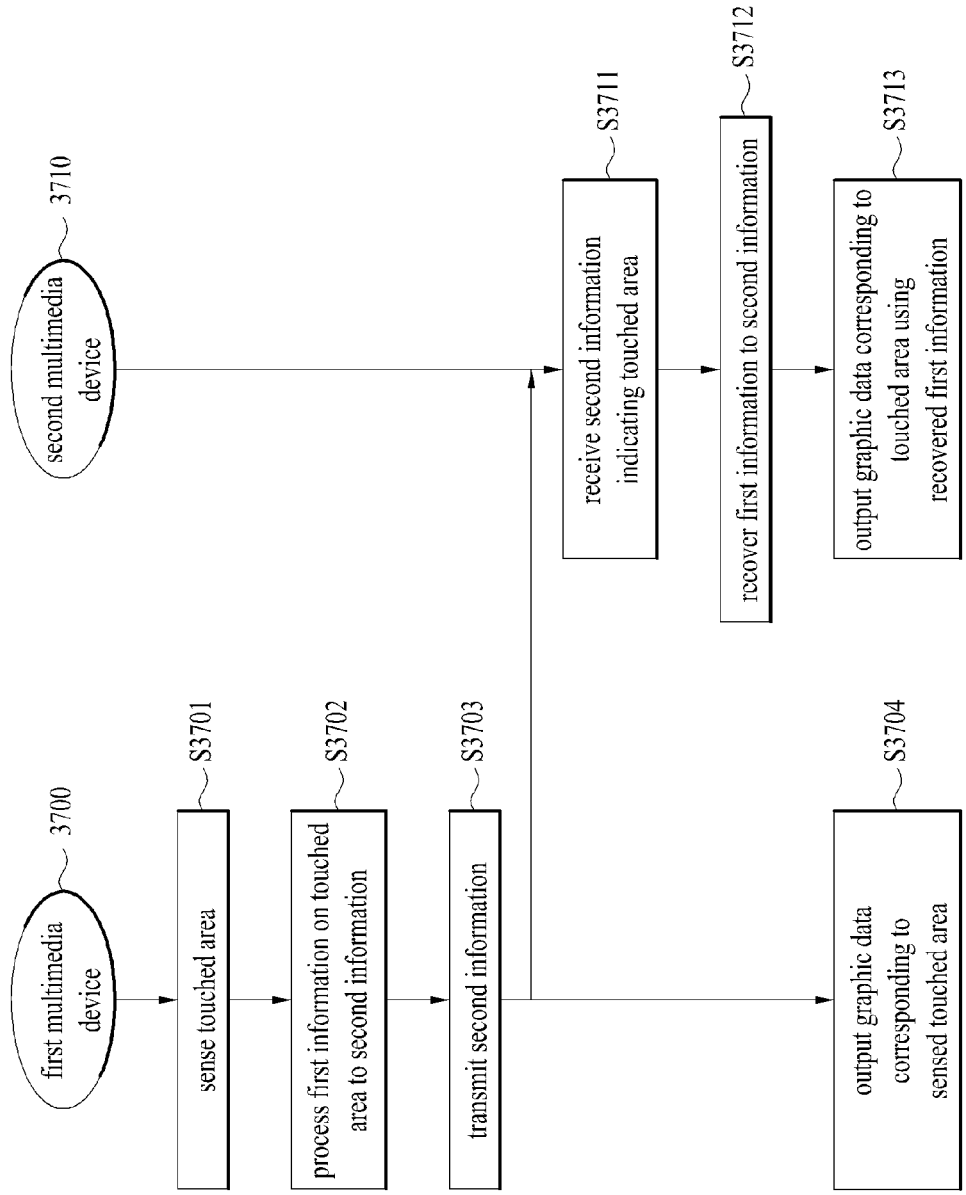

MULTIMEDIA DEVICE FOR HAVING TOUCH SENSOR AND METHOD FOR CONTROLLING THE SAME

Pursuant to 35 U.S.C. §119(a), this application claims the benefit of the Korean Patent Application No. 10-2012-0132232 filed on Nov. 21, 2012, the Korean Patent Application No. 10-2013-0003982 filed on Jan. 14, 2013, all of which are incorporated herein by reference in their entirety.

BACKGROUND OF THE INVENTION

Field of the Invention

The present specification relates to a device having a touch sensor, and more particularly, to a multimedia device having an area based touch sensor and a method for controlling the same.

Discussion of the Related Art

As touch sensors currently applied to a multimedia device, a decompressive touch sensor and an electrostatic touch sensor exist. The decompressive touch sensor includes a plurality of layers of a transparent material, wherein the uppermost layer is made of a thin and flexible material, the middle layer is made of a stability layer spaced apart from a liquid crystal screen to be disconnected from electricity, and the lowest layer is made of a conductive layer that senses a touch point.

In the meantime, the electrostatic touch sensor which has been recently used more is made of a glass coated with indium tin oxide, wherein each of four corners of the glass is provided with a sensor. A current continues to flow in the glass, and at this time, charges are accurately accumulated in horizontal and vertical directions of the sensor.

However, since a touch recognition algorithm according to the related art uses only a representative coordinate value of a touched portion, there was a limitation in that it was difficult to recognize or use a gesture or shape of a palm of the user.

Moreover, a touch based device according to the related art had a limitation in that it displays a graphic user interface (GUI) that reacts to a touch in the corresponding device only.

The above references are incorporated by reference herein where appropriate for appropriate teachings of additional or alternative details, features and/or technical background.

SUMMARY OF THE INVENTION

Accordingly, the present specification is directed to a multimedia device and a method for controlling the same, which substantially obviate one or more problems due to limitations and disadvantages of the related art.

An object of the present specification is to provide a multimedia device and a method for controlling the same, in which a shape or gesture not a point touched by a user is recognized.

Another object of the present specification is to provide a multimedia device and a method for controlling the same, which is intended to improve exactness of an area based touch (ABT) algorithm.

Still another object of the present specification is to provide a multimedia device and a method for controlling the same, in which an interface for quickly processing and implementing previously set functions on the basis of an area based touch shape or gesture of a user.

Further still another object of the present specification is to provide a multimedia device and a method for controlling the same, in which a GUI based on a touch of a first device may be implemented even by a second device in real time. For example, a solution for improving efficiency of high-capacity data transmission based on area touch and displaying a GUI based on a touch of a first multimedia device equally in the first multimedia device and a second multimedia device will be defined.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a method for controlling a multimedia device, which includes an area based touch sensor comprises the steps of recognizing at least one of a palm and a finger of a user through a touch sensor; determining at least one of a shape and a size of a touched area in accordance with the recognized result of the touch sensor; accessing a specific function stored in a memory module in accordance with the determined result; and outputting at least one of video data and audio data corresponding to the accessed specific function, wherein the determining step includes detecting the touched area and deciding whether the current touched area is a palm, on the basis of the detected touched area.

In another aspect of the present invention, a multimedia device, which includes an area based touch sensor, comprises a touch sensor configured to recognize at least one of a palm and a finger of a user; a controller configured to determine at least one of a shape and a size of a touched area in accordance with the recognized result of the touch sensor; a memory configured to store a first function corresponding to a first touch pattern and a second function corresponding to a second touch pattern; a memory controller configured to access a specific function stored in the memory in accordance with the determined result of the controller; and an output module configured to output at least one of video data and audio data corresponding to the accessed specific function.

In other aspect of the present invention, a multimedia device, which includes an area based touch sensor, comprises a touch sensor configured to sense at least one touched area; a data processor configured to process first information on the sensed touched area to second information to transmit the information to an external multimedia device; a communication module configured to transmit the processed second information to the external multimedia device; and a display module configured to output graphic data corresponding to the sensed touched area.

According to one embodiment of the present invention, a solution for recognizing a shape or gesture not a point touched by a user is provided.

Also, according to another embodiment of the present invention, it is technically advantageous in that a method for improving exactness of an area based touch (ABT) algorithm is defined.

Moreover, according to still another embodiment of the present invention, an interface for quickly processing and implementing previously set functions on the basis of an area based touch shape or gesture of a user is provided.

According to further still another embodiment of the present invention, a GUI based on a touch of a first device may be implemented even by a second device in real time. In more detail, it is advantageous in that a solution for improving efficiency of high-capacity data transmission based on area touch and displaying a GUI based on a touch of a first multimedia device equally in the first multimedia device and a second multimedia device will be provided.

It is to be understood that both the foregoing general description and the following detailed description of the present specification are exemplary and explanatory and are intended to provide further explanation of the specification as claimed.

BRIEF DESCRIPTION OF THE DRAWINGS

The embodiments will be described in detail with reference to the following drawings in which like reference numerals refer to like elements wherein:

The accompanying drawings, which are included to provide a further understanding of the specification and are incorporated in and constitute a part of this application, illustrate embodiment(s) of the specification and together with the description serve to explain the principle of the specification. In the drawings:

FIG. 11 and FIG. 12 are diagrams illustrating a process of determining a current touched area as a palm or finger after the merge process;

FIG. 25 to FIG. 29 are diagrams sequentially illustrating detailed processes for implementing FIG. 24;

FIG. 30 is a diagram illustrating data transmitted between a first multimedia device and a second multimedia device according to the second embodiment of the present invention;

FIG. 37 is a flow chart illustrating a method for controlling a first multimedia device and a second multimedia device in accordance with the second embodiment of the present invention.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

The suffixes "module" and "unit" for the elements used in the following description are given or used in common by considering facilitation in writing this disclosure only but fail to have meanings or roles discriminated from each other. The "module" and "unit" may be used together.

In the meantime, a multimedia device described in this specification corresponds to an intelligent multimedia device that additionally provides a computer support function in addition to a broadcasting receiving function. Accordingly, the multimedia device may be provided with a more convenient interface such as a manual input unit, a touch screen, a touch pad or a spatial remote controller. Also, the multimedia device enables e-mailing, web browsing, banking or games by accessing Internet or computer in accordance with the support of wire or wireless Internet function. For these various functions, a standardized general-purpose operating system (OS) may be used.

Accordingly, since the multimedia device described in the present invention may freely be provided with or delete various applications on a general-purpose OS kernel, it may perform user-friendly various functions. More detailed examples of the multimedia device include a mobile device provided with a touch sensor, a mobile phone, a tablet PC, a notebook computer, Internet TV, IPTV, network TV, an HBBTV, a smart TV, and open hybrid TV (OHTV).

Moreover, the embodiments of the present invention will now be described in detail with reference to the accompanying drawings and the disclosure illustrated in the accompanying drawings. However, it is to be understood that the present invention is not limited to or restricted by the following embodiments.

Although the terms used in the present invention are selected from generally known and used terms considering their functions in the present invention, the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
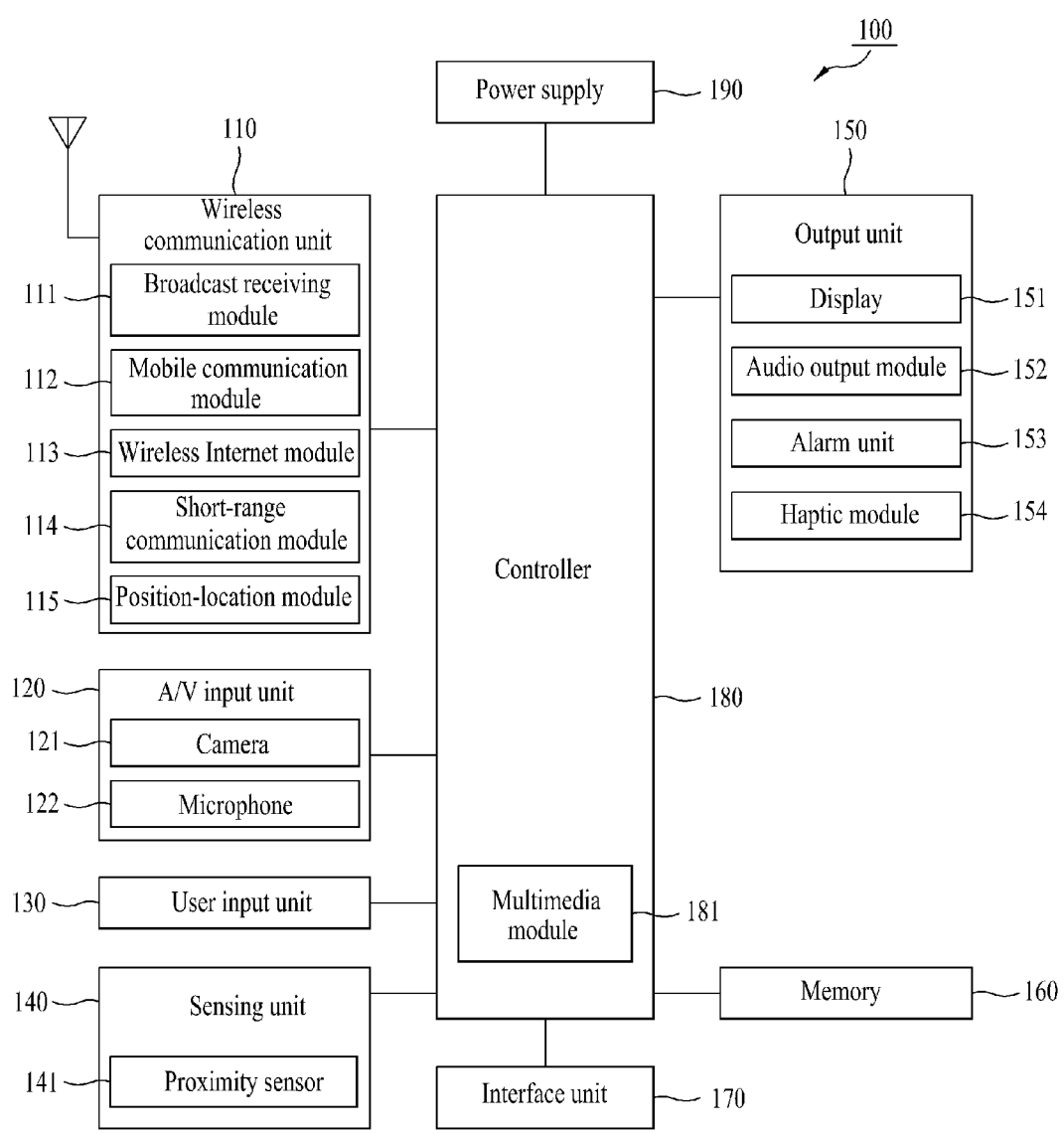
FIG. 1 is a block diagram illustrating a multimedia device according to one embodiment of the present invention.

FIG. 1 is a block diagram illustrating a multimedia device according to one embodiment of the present invention. As an example of the multimedia device, a mobile terminal 100 will be described. However, it is to be understood that the scope of the present invention is not limited to the mobile terminal.

The mobile terminal 100 may include a wireless communication module 110, an audio/video (A/V) input module 120, a user input module 130, a sensing module 140, an output module 150, a memory module 160, an interface module 170, a control module 180, and a power supply module 190. Since the modules shown in FIG. 1 are not required necessarily, a mobile terminal provided with modules more than or smaller than those shown in FIG. 1 may be provided.

Hereinafter, the above modules will be described.

The wireless communication module 110 may include one or more modules that enable wireless communication between the mobile terminal 100 and the wireless communication system or between the mobile terminal 100 and a network where the mobile terminal 100 is located. For example, the wireless communication module 110 may include a broadcasting receiving module 111, a mobile communication module 112, a wireless Internet module 113, a short-range communication module 114 and a position information module 115.

The broadcasting receiving module 111 receives a broadcast signal and/or broadcasting associated information from an external broadcast management server through a broadcast channel.

The broadcast channel may include a satellite channel and a terrestrial channel. The broadcast management server may generally refer to a server which generates and transmits a broadcast signal and/or broadcast associated information or a server which is provided with a previously generated broadcast signal and/or broadcast associated information and then transmits the provided signal or information to the mobile terminal. The broadcast signal may include a TV broadcast signal, a radio broadcast signal, and a data broadcast signal. Moreover, the broadcast signal may further include a broadcast signal combined with a TV or radio broadcast signal.

The broadcast associated information may refer to information associated with a broadcast channel, a broadcast program, or a broadcast service provider. The broadcast associated information may be provided through a mobile communication network. In this case, the broadcast associated information may be received by the mobile communication module 112.

The broadcast associated information may exist in various forms. For example, the broadcast associated information may exist in a format of an electronic program guide (EPG) of digital multimedia broadcasting (DMB) or electronic service guide (ESG) of digital video broadcast-handheld (DVB-H).

The broadcast receiving module 111 may be configured to receive digital broadcast signals through various types of broadcast systems such as digital multimedia broadcasting-terrestrial (DMB-T), digital multimedia broadcasting-satellite (DMB-S), media forward link only (MediaFLO), digital video broadcast-handheld (DVB-H), and integrated services digital broadcast-terrestrial (ISDB-T). The broadcast receiving module 111 may be configured to be suitable for the other broadcast systems, as well as the aforementioned digital broadcast systems.

The broadcast signal and/or broadcast associated information received by the broadcast receiving module 111 may be stored in the memory module 160.

The mobile communication module 112 transmits and receives radio signals to and from at least one of a base station, an external terminal, a server on a mobile communication network. Such radio signals may include audio call signals, video call signals, and/or various types of data based on text/multimedia message transmission and reception.

The wireless Internet module 113 refers to a module for wireless Internet access. This wireless Internet module 113 may internally or externally be provided to the mobile communication terminal 100. In this case, WLAN (Wireless LAN) (Wi-Fi), Wibro (Wireless broadband), Wimax (World Interoperability for Microwave Access), HSDPA (High Speed Downlink Packet Access), etc. may be used for the wireless Internet technology.

The short-range communication module 114 refers to a module for short-range communication. Examples of the short-range communication technology may include Bluetooth, radio frequency identification (RFID), infrared data association (IrDA), ultra-wideband (UWB), ZigBee, etc.

The position information module 115 is a module for identifying or obtaining the position of the mobile terminal 100. An example of the position information module 115 includes a global positioning system (GPS) module.

Referring to FIG. 1, the audio/video (A/V) input module 120 is configured to input audio or video signal, and may include a camera 121 and a microphone 122. The camera 121 processes image frames of still pictures or moving pictures, which are obtained by an image sensor in a video call mode or a photographing mode. And, the processed image frames may be displayed in the display module 151.

The image frames processed by the camera 121 may be stored in the memory module 160 or may be externally transmitted through the wireless communication module 110. Optionally, at least two cameras 121 may be provided to the mobile terminal 100 in accordance with a usage condition of the mobile terminal 100.

The microphone 122 receives an external audio signal in a phone call mode, recording mode or voice recognition mode, and processes and converts the audio signal into electric audio data. The processed audio data is transformed into a format transmittable to a mobile communication base station through the mobile communication module 112 in case of the call mode. The microphone 122 may include various noise removing algorithms to remove noise generated in the course of receiving the external audio signal.

The user input module 130 generates input data for allowing the user to control the operation of the mobile terminal. The user input module 130 may include a keypad, a dome switch, a touchpad (e.g., static pressure/capacitance), a jog wheel, a jog switch, etc.

The sensing module 140 generates sensing signals for controlling the operation of the mobile terminal 100 by sensing the current status of the mobile terminal 100, such as an open/close status of the mobile terminal 100, the location of the mobile terminal 100, the presence or non-presence of user contact with the mobile terminal 100, orientation of the mobile terminal 100, and acceleration/deceleration of the mobile terminal 100. For example, if the mobile terminal 100 is a slide phone type, the sensing module 140 may sense whether a sliding portion of the mobile terminal is open or closed. Also, the sensing module 140 may serve to sense the presence or non-presence of power supply of the power supply module 190, the presence or non-presence of a coupling or other connection between the interface module 170 and an external device.

The output module 150 is intended to output the outputs related to vision, hearing or touch, and may include the display module 151, an audio output module 152, an alarm module 153, and a haptic module 154.

The display module 151 displays and outputs information processed by the mobile terminal 100. For example, if the mobile terminal 100 is operating in a phone call mode, the display module 151 displays a user interface (UI) or graphic user interface (GUI) associated with the phone call mode. If the mobile terminal 100 is in a video call mode or a photographing mode, the display module 151 may display images which are taken and/or received, the UI or the GUI.

The display module 151 may include at least one of a liquid crystal display (LCD), a thin film transistor-liquid crystal display (TFT-LCD), an organic light-emitting diode display (OLED), a flexible display and a three-dimensional display (3D display).

Some of the above displays may be configured in a transparent type or light-transmitting type to allow the user to view the outside through the display. Such a display may be referred to as a transparent display. A main example of the transparent display includes a transparent OLED (TOLED). A rear structure of the display module 151 may also be configured in a light-transmitting type. In accordance with this structure, the user may view an object located at the rear of the body of the mobile terminal through the area occupied by the display module 151 of the body of the mobile terminal.

The mobile terminal 100 may include two or more display modules 151 in accordance with its implemented configuration. For example, the mobile terminal 100 may be provided with a plurality of display modules, which may be spaced apart from one another or integrated to form a single body on one side, or may respectively be arranged on different sides.

In case that the display module 151 and a sensor for detecting a touch action (hereinafter, referred to as 'touch sensor') configure a mutual layer structure (hereinafter, referred to as 'touch screen'), the display module 151 may be used as an input device as well as an output device. In this case, the touch sensor may be configured as a touch film, a touch sheet, a touch pad or the like.

Also, the touch sensor may be configured to convert a pressure applied to a specific portion of the display module 151 or a variation of a capacitance generated from a specific portion of the display module 151 into an electric input signal. Moreover, the touch sensor may be configured to detect a pressure of a touch as well as a touched position or area.

If a touch input is made to the touch sensor, signal(s) corresponding to the touch is transferred to a touch controller. The touch controller processes the signal(s) and then transfers the processed signal(s) to the control module 180. Therefore, the control module 180 may know which portion of the display module 151 has been touched.

Referring to FIG. 1, a proximity sensor 141 may be arranged in an internal area of the mobile terminal 100 surrounded by the touch screen or near the touch screen. The proximity sensor 141 is the sensor that detects the presence or non-presence of an object approaching a predetermined detecting surface or an object existing near the proximity sensor by using an electromagnetic field strength or infrared ray without mechanical contact. The proximity sensor 141 has durability longer than that of a contact type sensor and also has utility wider than that of the contact type sensor.

Examples of the proximity sensor may include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touch screen includes the electrostatic capacity proximity sensor, it is configured to detect the proximity of the pointer using a variation of electric field based on the proximity of the pointer. In this case, the touch screen (touch sensor) may be classified as the proximity sensor.

In the following description, for convenience of description, an action that the pointer is recognized to be located on the touch screen near the touch screen without contacting with the touch screen will be referred to as 'proximity touch'. And, an action that the pointer actually touches the touch screen will be referred to as 'contact touch'. The location on the touch screen proximity-touched by the pointer means the location of the pointer which vertically opposes the touch screen when the pointer performs the proximity touch.

Also, the proximity sensor 141 detects a proximity touch and a proximity touch pattern (for example, a proximity touch distance, a proximity touch direction, a proximity touch speed, a proximity touch time, a proximity touch location, a proximity touch shift state, etc.). Information corresponding to the detected proximity touch action and the detected proximity touch pattern may be output on the touch screen.

The audio output module 152 outputs audio data received from the wireless communication module 110 or stored in the memory module 160 in various modes including a call-receiving mode, a call mode, a recording mode, a voice recognition mode, a broadcast reception mode and the like.

Also, the audio output module 152 outputs an audio signal related to a function (for example, call signal receiving audio, message receiving audio, etc.) performed by the mobile terminal 100. The audio output module 152 may include a receiver, a speaker and a buzzer.

The alarm module 153 outputs a signal for announcing the occurrence of an event in the mobile terminal 100. Examples of the event generated in the mobile terminal 100 may include a call signal received event, a message received event and a key signal input event. The alarm module 153 may output a signal for announcing the event occurrence by way of other types such as vibration as well as video or audio signal. Since the video signal or audio signal may be output through the display module 151 or the audio output module 152, the display module 151 and the audio output module 152 may be classified as a part of the alarm module 153.

A haptic module 154 generates various tactile effects that can be sensed by a user. Vibration is a representative one of the tactile effects generated by the haptic module 154. Strength and pattern of the vibration generated by the haptic module 154 are controllable. For example, different vibrations may be output in a manner of being synthesized together or may be output in sequence.

The haptic module 154 may generate various tactile effects as well as the vibration. For example, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device, and the like.

The haptic module 154 may be implemented to enable a user to sense the tactile effect through a muscle sense of finger, arm or the like as well as to transfer the tactile effect through a direct contact. Optionally, at least two haptic modules 154 may be provided to the mobile terminal 100 in accordance with the corresponding configuration type of the mobile terminal 100.

The memory module 160 may generally be used to store various types of programs for the operation of the control module 180, or may temporarily store input/output data (for example, phonebook data, messages, still pictures, moving pictures, etc.). The memory module 160 may store data related to vibration and voice of various patterns output during the touch input on the touch screen.

The memory module 160 may include at least one type of memory of a flash memory type, a hard disk type, multimedia card micro type, a card-type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disk. Also, the mobile terminal 100 may be operation in association with a web storage for performing a storage function of the memory module 160 on Internet.

The interface module 170 serves to interface with all the external devices connected with the mobile terminal 100. The interface module 170 receives data from the external devices or is supplied with the power and then transfers the data or power to the respective elements of the mobile terminal 100 or enables data within the mobile terminal 100 to be transferred to the external devices. For example, the interface module 170 may include a wired/wireless headset port, an external charger port, a wired/wireless data port, a memory card port, a port for coupling to a device having an identity module, audio input/output (I/O) ports, video input/output (I/O) ports, and an earphone port.

In this case, the identity module is the chip for storing various kinds of information for authenticating a use authority of the mobile terminal 100, and may include a User Identify Module (UIM), a Subscriber Identify Module (SIM), a Universal Subscriber Identity Module (USIM) and/or the like. Also, a device provided with the identity module (hereinafter, referred to as 'identity device') may be manufactured in a type of a smart card. Therefore, the identity module may be connected with the mobile terminal 100 through the corresponding port.

When the mobile terminal 100 is connected to an external cradle, the interface module 170 becomes a passage for supplying the mobile terminal 100 with a power from the cradle or a passage for delivering various command signals input from the cradle by a user to the mobile terminal 100. Each of the various command signals input from the cradle or the power may be operated as a signal enabling the user to recognize that the mobile terminal 100 has been exactly loaded in the cradle.

The control module 180 typically controls the overall operations of the mobile terminal 100. For example, the control module 180 performs the control and processing associated with voice calls, data communications, video calls, etc. The control module 180 may include a multimedia module 181 that provides multimedia playback. The multimedia module 181 may be configured as a part of the control module 180, or may be implemented separately from the control module 180.

Moreover, the control module 180 may perform a pattern recognizing process for recognizing a writing input or a picture drawing input carried out on the touch screen as characters or images, respectively.

The power supply module 190 provides the power required by the various elements for the mobile terminal 100 by receiving the external power and the internal power under the control of the control module 180.

The various embodiments described herein may be implemented in a computer or computer-like readable medium using, for example, computer software, hardware, or some combination thereof.

For a hardware implementation, the embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electronic units designed to perform the functions described herein. In some case, such embodiments may also be implemented by the control module 180.

For a software implementation, the embodiments such as procedures or functions described herein may be implemented with separate software modules, each of which performs one or more of the functions and operations described in this specification. The software codes may be implemented with a software application written in any suitable programming language. Also, the software codes may be stored in the memory module 160, and may be executed by the control module 180.

Figure 2A:
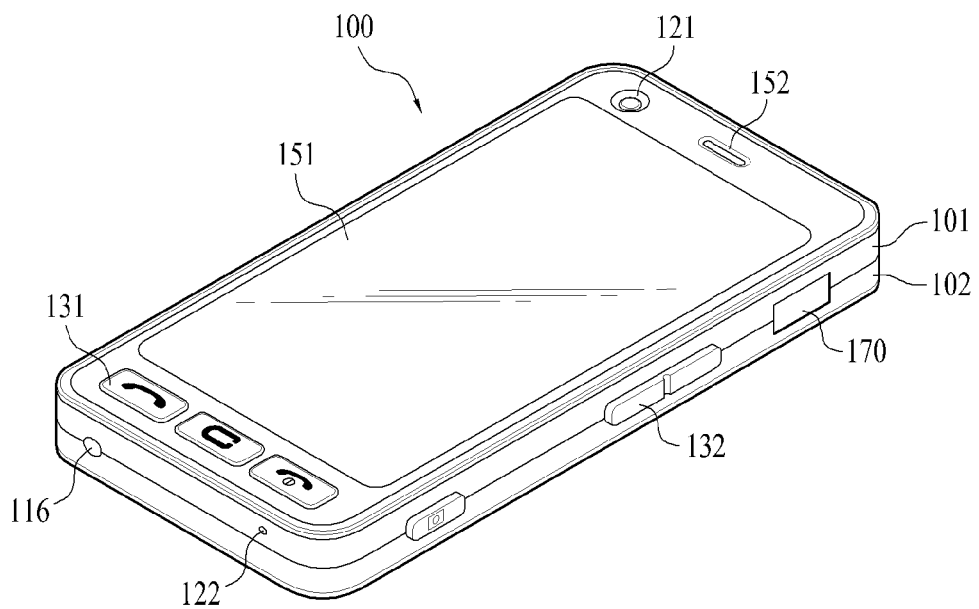
FIG. 2a is a front perspective view illustrating a multimedia device shown in FIG. 1.

FIG. 2a is a front perspective view illustrating a multimedia device shown in FIG. 1. As an example of the multimedia device, a mobile terminal 100 will be described in the same manner as FIG. 1.

The mobile terminal 100 shown in FIG. 2a is provided with a bar type body. However, the present invention is not limited to such a bar type body, and may be applied to various structures such as a slide type, a folder type, a swing type, and a swivel type, in which at least two bodies are movably combined with each other.

The body includes a case (casing, housing, cover, and the like) constituting appearance. In this embodiment, the case may be divided into a front case 101 and a rear case 102. Various electronic parts are provided in a space formed between the front case 101 and the rear case 102. At least one middle case may additionally be arranged between the front case 101 and the rear case 102.

The cases may be formed by injection molding of a synthetic resin or may be formed of a metal material such as stainless steel (STS) or titanium (Ti).

The display module 151, the audio output module 152, the camera 121, the user input modules 130 (131 and 132), the microphone 122, and the interface module 170 may be provided in the body of the mobile terminal, mainly the front case 101.

The display module 151 occupies most of a main side of the front case 101. The audio output module 152 and the camera 121 are arranged in an area adjacent to one end of both ends of the display module 151, and the user input module 131 and the microphone 122 are arranged in an area adjacent to the other end. The user input module 132 and the interface module 170 may be arranged at the sides of the front case 101 and the rear case 102.

The user input module 130 of FIG. 1 may be manipulated to receive a command for controlling the operation of the mobile terminal 100, and may include a plurality of manipulating units 131 and 132. The manipulating units 131 and 132 may be referred to as manipulating portions, and any manner may be applied to the manipulating units 131 and 132 if the user manipulates the units with a tactile feeling (tactile manner).

Contents input by the first and second manipulating units 131 and 132 may be set in various manners. For example, a command such as start, end, and scroll may be input to the first manipulating unit 131, and a command such as size control of audio output from the audio output module 152 or switching of the display module 151 to a touch recognition mode may be input to the second manipulating unit 132.

Figure 2B:
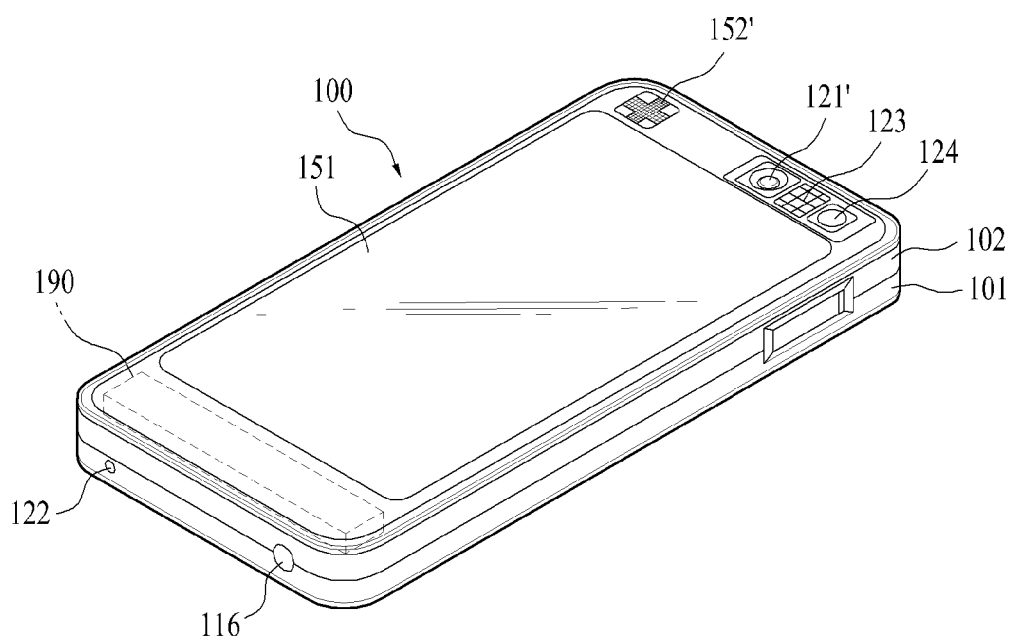
FIG. 2b is a rear perspective view illustrating a multimedia device shown in FIG. 1.

FIG. 2b is a rear perspective view illustrating a multimedia device shown in FIG. 1. As an example of the multimedia device, a mobile terminal 100 will be described in the same manner as FIG. 1.

Referring to FIG. 2b, a camera 121' may additionally be provided in the rear side of the body of the mobile terminal, that is, the rear case 102. The camera 121' may have a photographing direction substantially opposite to that of the camera 121 (see FIG. 2a), and may have pixels different from those of the camera 121.

For example, it is preferable that the camera 121 has low pixels to take a face of the user and transmit the taken face to the other party in case of video communication while the camera 121' has high pixels as it is general that it takes a normal subject and then does not transmit the taken subject immediately. The cameras 121 and 121' may be provided in the body of the mobile terminal to enable rotation or pop-up.

A flash 123 and a mirror 124 are additionally arranged to adjoin the camera 121'. The flash 123 illuminates light towards a subject if the camera 121' takes the subject. The mirror 124 may allow the user to view his/her face, etc. if the user takes himself/herself (self photographing) by using the camera 121'.

An audio output module 152' may additionally be arranged at the rear side of the body of the mobile terminal. The audio output module 152' may implement a stereo function together with the audio output module 152 (see FIG. 2a), and may be used to implement a speaker phone mode in case of communication.

In addition to an antenna for communication, an antenna 116 for receiving a broadcast signal may additionally be arranged at the side of the body of the mobile terminal. The antenna 116 constituting a part of the broadcast receiving module 111 (see FIG. 1) may be provided to be ejected from the body of the mobile terminal.

The power supply module 190 is provided in the body of the mobile terminal 100 to supply the power to the mobile terminal 100. The power supply module 190 may be built in the body of the mobile terminal, or may be configured to be detachably provided from the outside of the body of the mobile terminal.

A touch pad for sensing a touch may additionally be provided in the rear case 102. The touch pad may be configured in a light-transmittive type in the same manner as the display module 151. In this case, if the display module 151 is configured to output vision information from both sides, the vision information may be recognized even through the touch pad. The information output from both sides may be controlled by the touch pad 135. Unlike this, a display may additionally be provided in the touch pad, whereby the touch screen may be arranged in the rear case 102.

Figure 3:
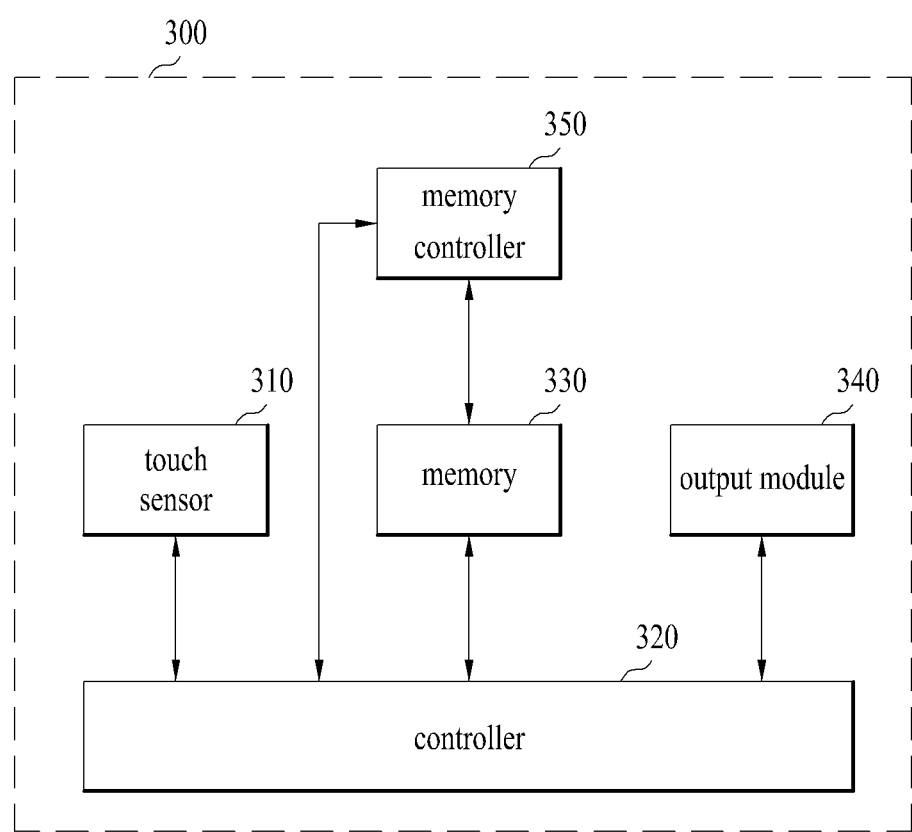
FIG. 3 is a diagram more briefly illustrating modules in a multimedia device according to one embodiment of the present invention.

FIG. 3 is a diagram more briefly illustrating modules in a multimedia device according to one embodiment of the present invention. The multimedia device 300 shown in FIG. 3 corresponds to at least one of a tablet PC, a mobile phone, and a television.

A touch sensor 310 is designed to recognize at least one of palm and finger of the user, and a controller 320 determines at least one of a shape and a size of a touched area in accordance with a recognized result of the touch sensor.

A memory 330 stores a first function corresponding to a first touch pattern and a second function corresponding to a second touch pattern, and a memory controller 350 accesses a specific function stored in the memory 330 in accordance with the determined result of the controller 320.

The output module 340 is designed to output at least one of video data and audio data, which correspond to the accessed specific function.

The controller 320 according to another embodiment is designed to detect a touched area, merge at least one node within the detected area with another node, and decide whether the current touched area is a palm, on the basis of the detected touched area. The detecting process will be described in more detail with reference to FIG. 4 to FIG. 8. Also, the merging process will be described in more detail with reference to FIG. 9 and FIG. 10. Moreover, the decision process will be described in more detail with reference to FIG. 11 and FIG. 12.

According to still another embodiment of the present invention, if it is decided that the current touched area is a palm, the controller 320 is designed to capture an image within the screen, which is currently output, and store the captured image in the memory 330. This will be described in more detail with reference to FIG. 14.

According to further still another embodiment of the present invention, the controller 320 controls the memory 330 to implement the first function stored in memory 330, in accordance with directionality of the current touched area. This will be described in more detail with reference to FIG. 17 to FIG. 20.

According to further still another embodiment of the present invention, the controller 320 tracks variations of the area touched at the first timing and the area touched at the second timing, and controls the operation to implement the second function stored in the memory 330 in accordance with directionality of the variations as a result of the tracking. This will be described in more detail with reference to FIG. 15 and FIG. 16.

According to further still another embodiment of the present invention, the controller 320 calculates transition in accordance with variations of values of the nodes within the touched area, and decides a labeling value of a node of a previous row or column as a labeling value of next node on the basis of the calculated transition (hereinafter, refer to FIG. 5 to FIG. 8).

Figure 9:
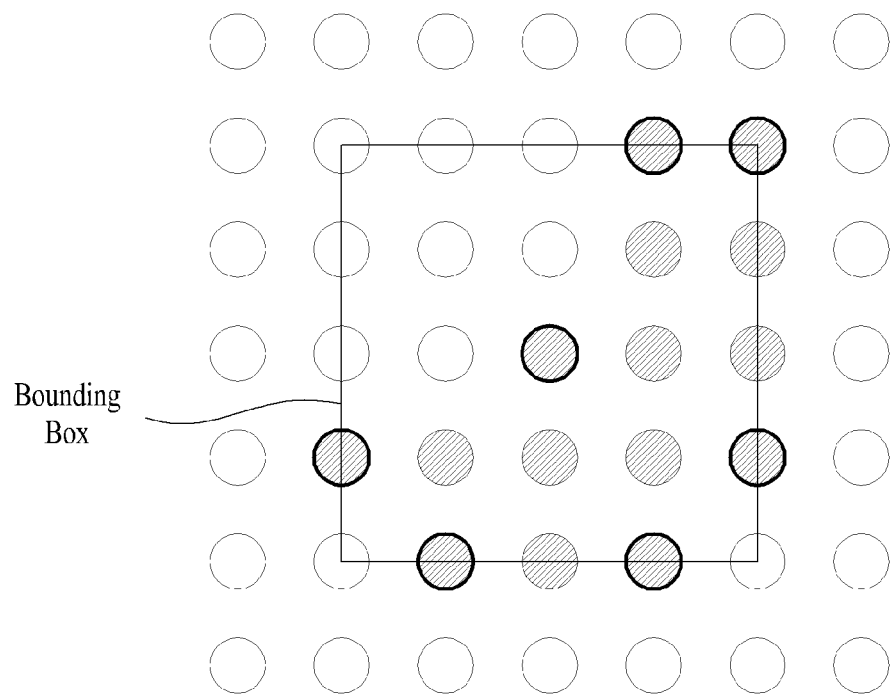
FIG. 9 is a diagram in more detail illustrating nodes in a touched area shown in FIG. 5.
Figure 10:
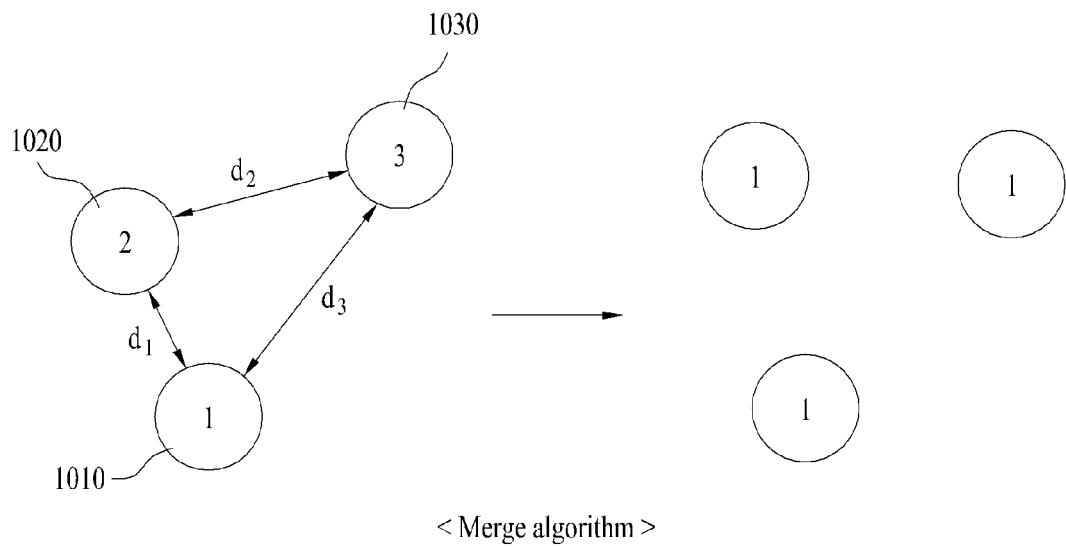
FIG. 10 is a diagram illustrating a process of merging nodes shown in FIG. 9 in accordance with a previously set reference.

According to further still another embodiment of the present invention, the controller 320 is designed to extract the distance among three adjacent nodes (the distance between the first node and the second node will be referred to as D1, the distance between second node and the third node will be referred to as D2, and the distance between the third node and the first node will be referred to as D3), and to regard the three nodes as one node if D2 is greater than D1, D2 is less than a previously set value, and D3 is greater than the previously set value (hereinafter, refer to FIG. 9 and FIG. 10).

According to further still another embodiment of the present invention, the controller 320 decides the current touched area as a palm or non-palm in accordance with the relation among the node which is not touched and the other nodes (hereinafter, refer to FIG. 11 and FIG. 12).

According to further still another embodiment of the present invention, the controller 320 calculates the number of periods of increase or decrease on the basis of a start point of the touched point and estimates the calculated number of periods as the number of recognized fingers (hereinafter, refer to FIG. 13).

Figure 4:
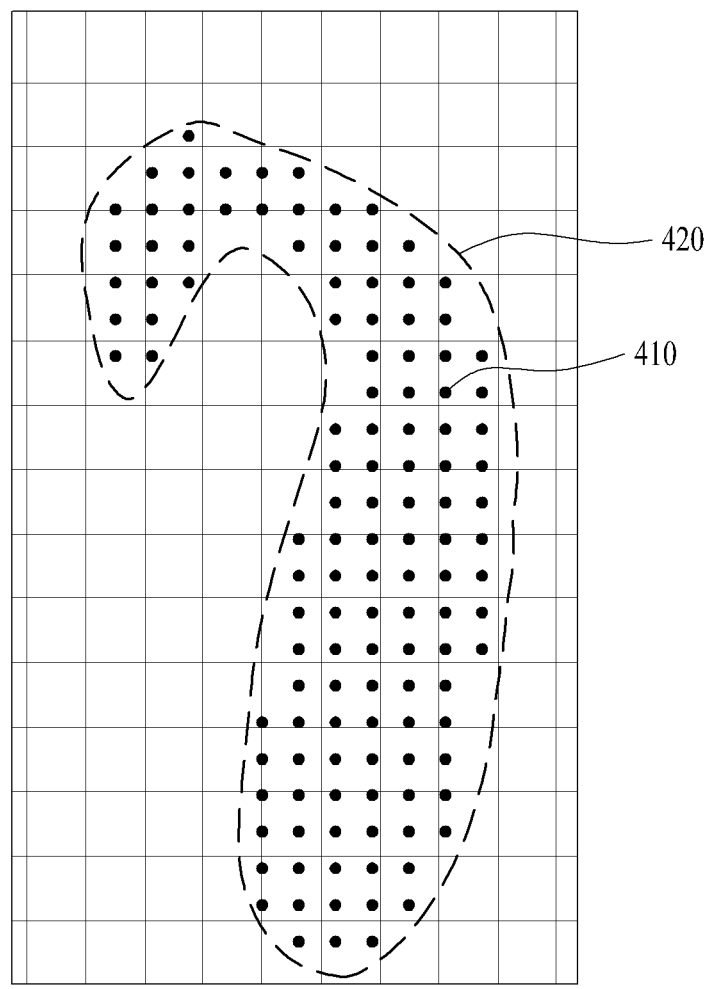
FIG. 4 is a diagram illustrating a touched area recognized by a multimedia device according to one embodiment of the present invention in comparison with a touch point recognized by the related art.

FIG. 4 is a diagram illustrating a touched area recognized by a multimedia device according to one embodiment of the present invention in comparison with a touch point recognized by the related art.

As shown in FIG. 4, according to the related art, only a main coordinate value 410 within a touched area has been extracted. Accordingly, a problem has occurred in that functions for recognizing or using the area have not been provided.

On the other hand, the multimedia device according to one embodiment of the present invention may estimate a shape of the touched area by extracting a set of edge points from an entire area 420, which is touched. For example, the multimedia device may be designed to provide different functions per touched area by using eccentricity of a long axis and a short axis corresponding to the shape of the touched area and an axis of least inertia representing the shape within the scope of the present invention.

Moreover, as an algorithm for recognizing the touched area, three processes (ex, palm detection, merge algorithm, and palm decision) will be required. Any one of the processes may be omitted or another process may be additionally provided in accordance with the need of the person skilled in the art within the scope of the present invention. Hereinafter, the processes will be described in more detail with reference to the drawings.

Figures 5, 6:
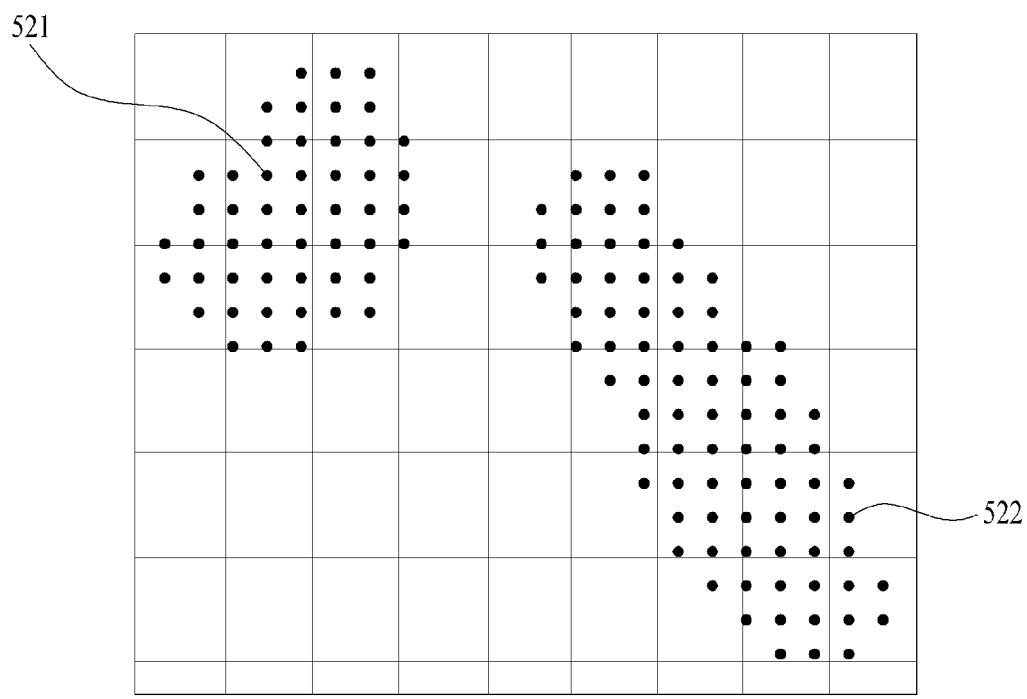
FIG. 5 is a diagram illustrating a touched area initially recognized by a multimedia device according to one embodiment of the present invention.
FIG. 6 is a diagram illustrating a real node value of a touched area shown in FIG. 5, which is analyzed in accordance with a matrix.

FIG. 5 is a diagram illustrating a touched area initially recognized by a multimedia device according to one embodiment of the present invention. Hereinafter, the touched area initially recognized by the multimedia device according to one embodiment of the present invention will be described with reference to FIG. 5.

For example, if the user of the multimedia device touches a screen of the device with his/her fist or palm, a one perfect area shape may not be recognized. If the same pressure is not applied between a body (for example, fist or palm) of the user and the screen, as shown in FIG. 5, two areas 521 and 522 are initially sensed. As shown in FIG. 5, each area is configured by a plurality of real nodes (RNs), each of which has a unique node value.

FIG. 6 is a diagram illustrating a real node value of a touched area shown in FIG. 5, which is analyzed in accordance with a matrix. Hereinafter, unique values of real nodes of the touched area will be digitized in accordance with a matrix with reference to FIG. 6.

As shown in FIG. 6, a column of a first line is digitized as 66, 107, 70, 49, 45, 46, etc., and a row of the first line is digitized as 66, 99, 70, 52, 56, 54, 48, 47, etc. At this time, a maximum value of a column per line is extracted, and a maximum value of a row per line is extracted.

Figure 7:
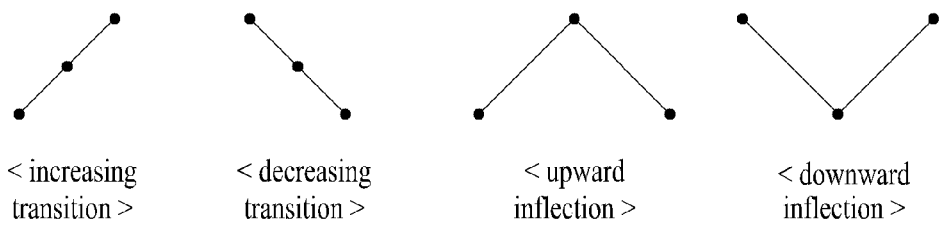
FIG. 7 is a diagram illustrating transition of a real node value shown in FIG. 5.

FIG. 7 is a diagram illustrating transition of a real node value shown in FIG. 5. Hereinafter, a method for analyzing transition based on a maximum value per line of the touched area will be described with reference to FIG. 5 to FIG. 7.

Once a maximum (MAX) value per line has been extracted, the extracted maximum values for each line may be compared with each other in order to analyze the transition of maximum values, as illustrated in FIG. 7. For example, a maximum value of a first line may be 'a', a maximum value of a second line may be 'b', and a maximum value of a third line may be 'c'. These maximum values may be compared with one another.

In case of a<b<c, it is regarded that the unique values of the real nodes within the touched area are increased. In case of a>b>c, it is regarded that the unique values of the real nodes within the touched area are decreased. Also, in case of b>a, c, it is regarded that the unique values of the real nodes within the touched area are upwardly inflected. And, in case of b<a, c, it is regarded that the unique values of the real nodes within the touched area are downwardly inflected.

Figure 8:
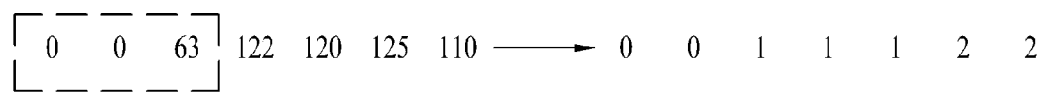
FIG. 8 is a diagram illustrating a process of labeling a real node value shown in FIG. 5.

FIG. 8 is a diagram illustrating a process of labeling a real node value shown in FIG. 5. Hereinafter, a process for labeling the maximum value per line in accordance with the transition obtained in FIG. 7 will be described with reference to FIG. 5 to FIG. 8.

First of all, a first value 63, which is not 0 from the maximum values shown in FIG. 8, is labeled as 1. Also, since three sequent maximum values 0, 63, 122 are likely to be increased, it is designed to succeed (or maintain) a previous labeling value. Accordingly, the maximum value 122 is labeled as the previous labeling value 1.

Moreover, since three sequent maximum values 63, 122, 120 are likely to be upwardly varied, it is also designed to succeed (or maintain) the previous labeling value. Accordingly, the maximum value 122 is labeled as the previous labeling value 1.

Also, since three sequent maximum values 122, 120, 125 are likely to be downwardly varied, a new labeling value is defined. Accordingly, the maximum value 122 is labeled as a new labeling value 2 not the previous labeling value.

Since three sequent maximum values 120, 125, 110 are likely to be upwardly varied, it is designed to succeed (or maintain) the previous labeling value. Accordingly, the maximum value 110 is labeled as the labeling value 2 which is the same as that of the previous maximum value.

The aforementioned processes are respectively implemented on the basis of column and row. Accordingly, a size of the touched palm is determined by the following Equation 1.

$$\text{Size}=(\text{Row label count})\times(\text{Column label count}) \quad \text{[Equation 1]}$$

The process for detecting the size of the touched area has been described in detail with reference to FIG. 5 to FIG. 8. Hereinafter, the process for merging some nodes within the detected touched area will be described with reference to FIG. 9 and FIG. 10.

FIG. 9 is a diagram in more detail illustrating nodes in a touched area shown in FIG. 5.

As a result of detection of the touched area described with reference to FIG. 5 to FIG. 8, it is assumed that the size of the touched area is determined by a bounding box shown in FIG. 9.

In order to define the touched area in more detail, among on nodes 920 which are touched, it is required to decide on node corresponding to an edge node 930 that decides a set of edge points.

As shown in FIG. 9, if the on nodes 920 are adjacent to off nodes 910 in horizontal and vertical directions, such on nodes 920 are regarded as edge nodes 930. Accordingly, as shown in FIG. 9, a total of seven edge nodes 930 are extracted.

In the meantime, it is assumed that the off node 910 does not exist between the on node 920 and another on node 920 in FIG. 9. However, the off node may exist between the on node and another on node in accordance with the touch state of the user or performance of the device. At this time, it is preferably required to recognize the off node as one palm to reduce an error rate rather than recognize the off node as a separate area to cause an error. This will be described with reference to FIG. 10.

FIG. 10 is a diagram illustrating a process of merging nodes shown in FIG. 9 in accordance with a previously set reference.

For example, as shown in FIG. 10, it is assumed that three nodes 1010, 1020 and 1030 are not adjacent to one another but located within a previously set range.

First of all, the distance between the first node 1010 and the second node 1020 corresponds to d1, and the distance between the second node 1020 and the third node 1030 corresponds to d2, and the distance between the third node 1030 and the first node 1010 corresponds to d3.

At this time, if the following Equation 2 is satisfied, as shown in FIG. 10, the three nodes 1010, 1020 and 1030 are regarded as one node. In other words, three nodes are merged to one node.

$$d1 \leq d2 \leq \text{predefined value} \leq d3 \quad \text{[Equation 2]}$$

The process for deciding the touched area as a palm or finger will be described with reference to FIG. 11 and FIG. 12 on the basis of the process of detecting the size of the decided touched area (for example, palm, etc.) as described with reference to FIG. 5 to FIG. 8 and the process of merging the nodes described with reference to FIG. 9 and FIG. 10.

Figure 11:
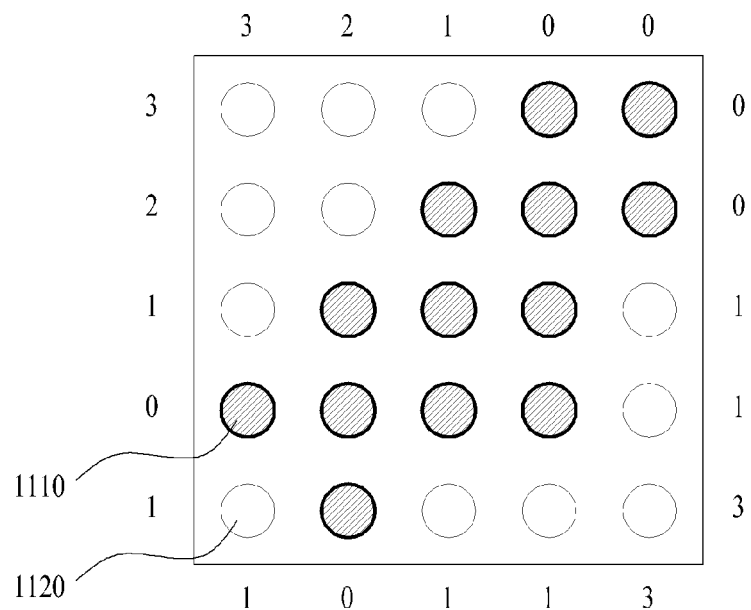

FIG. 11 and FIG. 12 are diagrams illustrating a process of deciding a current touched area as a palm or finger after the merge process;

First of all, as shown in FIG. 11, white space values per line of the touched area are labeled as 0, 1, 2, 3. Also, on nodes 1110 are identified from off nodes 1120 within the decided touched area. Some of the on nodes 1110 may be merged to one by the Equation 2 within the scope of the present invention.

In the meantime, as one example of the Equation shown in FIG. 12, it is decided whether the touched area is a palm or finger, in accordance with the relation between the on nodes and the off nodes. The person skilled in the art may use another Equation not the Equation shown in FIG. 12, and such modification in design pertains to the scope of the present invention.

First of all, as shown in FIG. 12, the number of off nodes 1120 is regarded as white space count. Moreover, when the jth row is observed on the basis of the upper bound of the touched area decided in FIG. 11, the distance to the point where the labeling value of 1 first occurs is defined as Length (T) (see FIG. 12).

In the meantime, when the ith column is observed on the basis of the right bound of the touched area decided in FIG. 11, the distance to the point where the labeling value of 1 first occurs is defined as Length (R) (see FIG. 12).

Moreover, when the jth row is observed on the basis of the low bound of the touched area decided in FIG. 11, the distance to the point where the labeling value of 1 first occurs is defined as Length (B) (see FIG. 12).

And, when the ith column is observed on the basis of the left bound of the touched area decided in FIG. 11, the distance to the point where the labeling value of 1 first occurs is defined as Length (L) (see FIG. 12).

Accordingly, in accordance with the relation among the white space count and Length (T, R, B, L) values, the current touched area is regarded as a palm if the first three Equations for determining that the object is a palm as shown in FIG. 12 are satisfied (i.e., the 'if' statement and the two 'else if' statements). As shown in FIG. 12, if none of the first three Equations are satisfied, the touched area is regarded as a finger (i.e., the fourth 'else' statement).

In the meantime, if the current touched area is recognized by a finger, a process for recognizing the number of fingers one by one to implement more various UX/UI will be required. This will be described with reference to FIG. 13a and FIG. 13b.

Figure 13A:
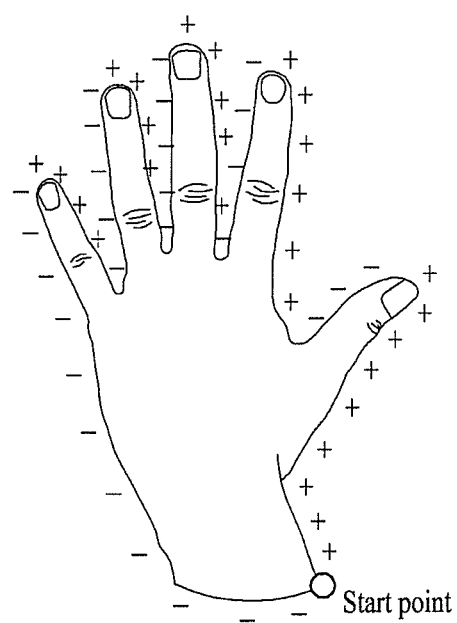
FIG. 13a and FIG. 13b are diagrams illustrating processes of detecting the number of fingers of a user.
Figure 13B:
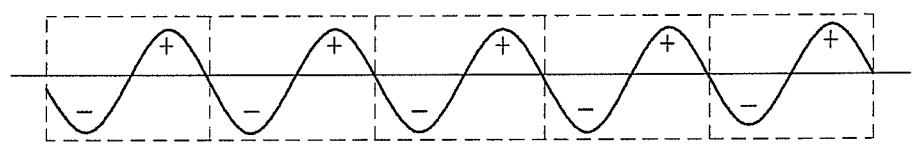

FIG. 13a and FIG. 13b are diagrams illustrating processes of detecting the number of fingers of a user.

As described above, after a set of edge points of the touched area is extracted, the shape of the touched area may be determined using the extracted set of edge points. Moreover, when the number of fingers is additionally used as gesture information, the method for detecting how many fingers have been touched will be described with reference to FIG. 13a and FIG. 13b.

First of all, as shown in FIG. 13a, if an edge point of the touched area is close to a start point on the basis of the start point, it may be expressed as a positive value. If the edge point of the touched area is far away from the start point on the basis of the start point, it may be expressed as a negative value. A design opposite to FIG. 13a pertains to the scope of the present invention. Moreover, the start point may be decided by a minimum Y position value and a maximum X position value of the touched area.

The positive value (+) and the negative value (−), which are decided in FIG. 13a, will be expressed as a sine function as shown in FIG. 13b. Accordingly, when an interval where positive numbers are and negative numbers are repeated is regarded as one period, it is noted that a total of five periods are obtained, and it is estimated that fingers equivalent to the number of periods are included in the touched area.

Figure 14:
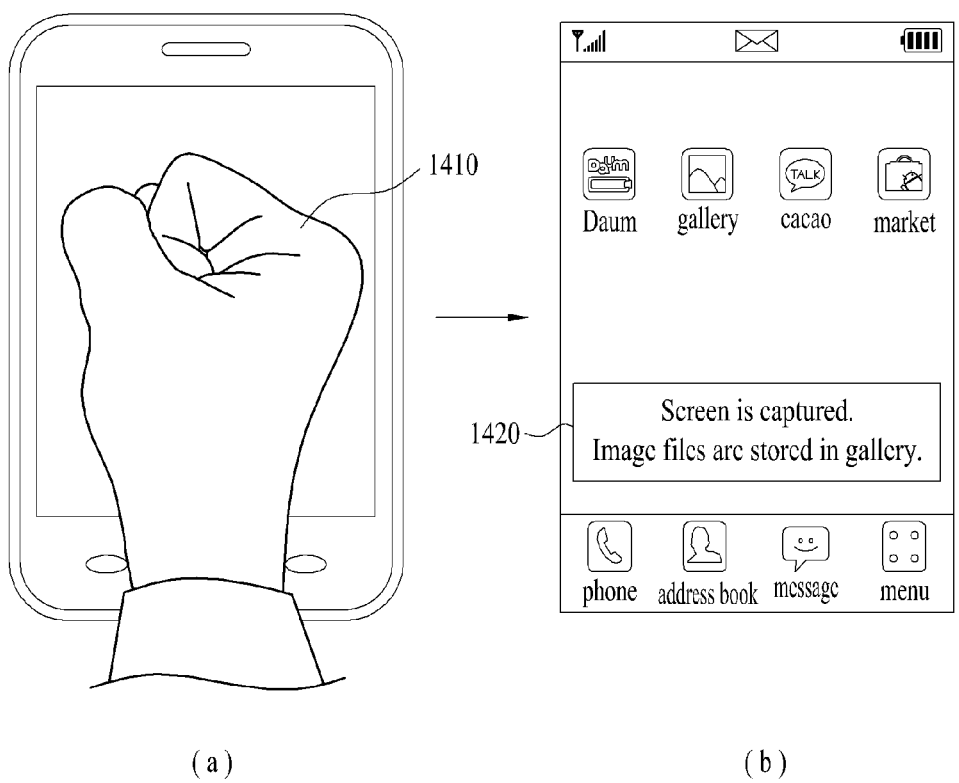
FIG. 14 is a diagram illustrating a first embodiment that implements a specific function previously stored in a memory module, on the basis of a touched area recognized by one embodiment of the present invention.

FIG. 14 is a diagram illustrating a first embodiment that implements a specific function previously stored in a memory module, on the basis of a touched area recognized by one embodiment of the present invention. The first embodiment shown in FIG. 14 may be implemented with reference to FIG. 1 to FIG. 13B. It is to be understood that the scope of the present invention is not limited to the description made in FIG. 1 to FIG. 13B.

First of all, as shown in (a) of FIG. 14, it is assumed that a specific shape (for example, fist) 1410 of a hand of a user is sensed by a touch screen of a multimedia device according to one embodiment of the present invention.

The multimedia device that has recognized the specific shape implements a previously set function corresponding to the specific shape by accessing the memory module. For example, as shown in (b) of FIG. 14, the multimedia device serves to capture a current screen and automatically store the image captured in a specific folder (ex, gallery). Also, in order to improve convenience of the user, a guide message 1420 is output at the same time.

Figure 15:
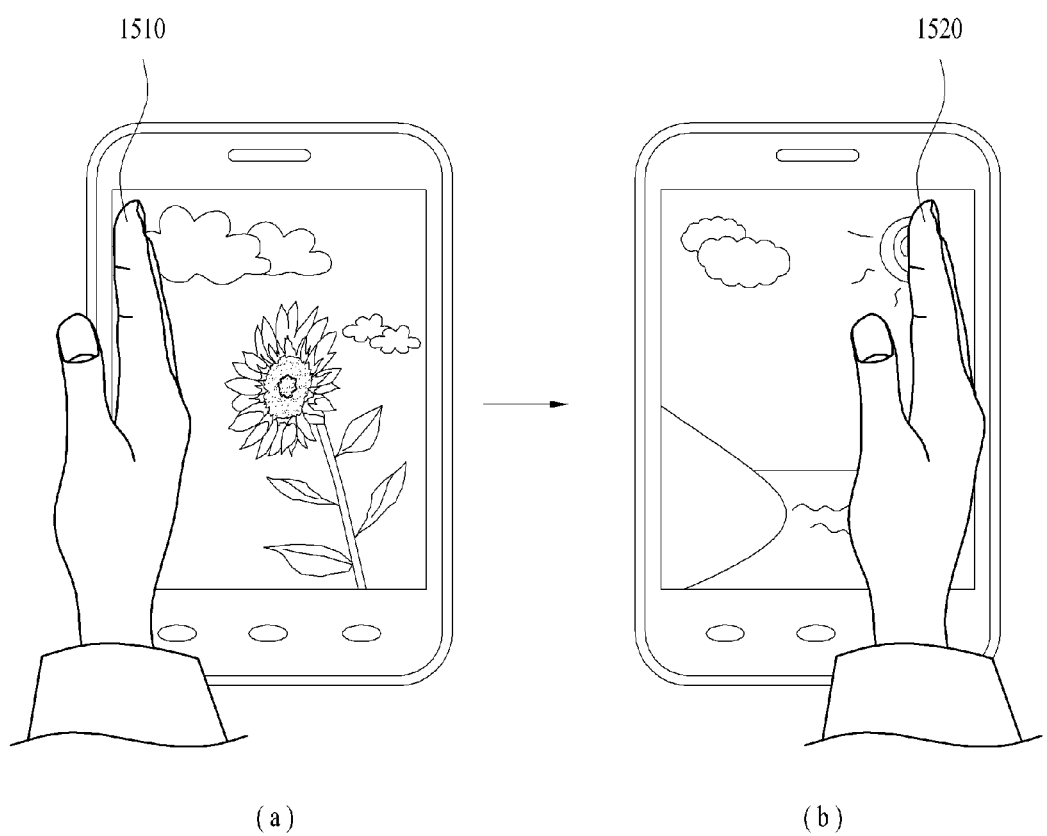
FIG. 15 is a diagram illustrating a second embodiment that implements a specific function previously stored in a memory module, on the basis of a touched area recognized by one embodiment of the present invention.

FIG. 15 is a diagram illustrating a second embodiment that implements a specific function previously stored in a memory module, on the basis of a touched area recognized by one embodiment of the present invention. The second embodiment shown in FIG. 15 may be implemented with reference to FIG. 1 to FIG. 13B. It is to be understood that the scope of the present invention is not limited to the description made in FIG. 1 to FIG. 13B.

As described above, the multimedia device according to one embodiment of the present invention may recognize that one finger has been touched on the screen. Also, the multimedia device may calculate that the touched finger has moved from the left side 1510 to the right side 1520 as shown in (a) and (b) of FIG. 15 through tracking of the touched area.

For example, as shown in (a) of FIG. 15, if the touched finger is moved from the left side to the right side in a state that a specific application is currently implemented, another application which was implemented just before is implemented as shown in (b) of FIG. 15. Although only an end point of a finger has been recognized in the related art, an entire area of a finger may be recognized in accordance with one embodiment of the present invention.

A case where a touched direction is opposite to the direction of FIG. 15 and a case where a varied application corresponds to a previous application or next application pertain to the scope of the present invention. Accordingly, the memory module of the multimedia device is designed to previously store the implementation order of the application or time information.

Figure 16:
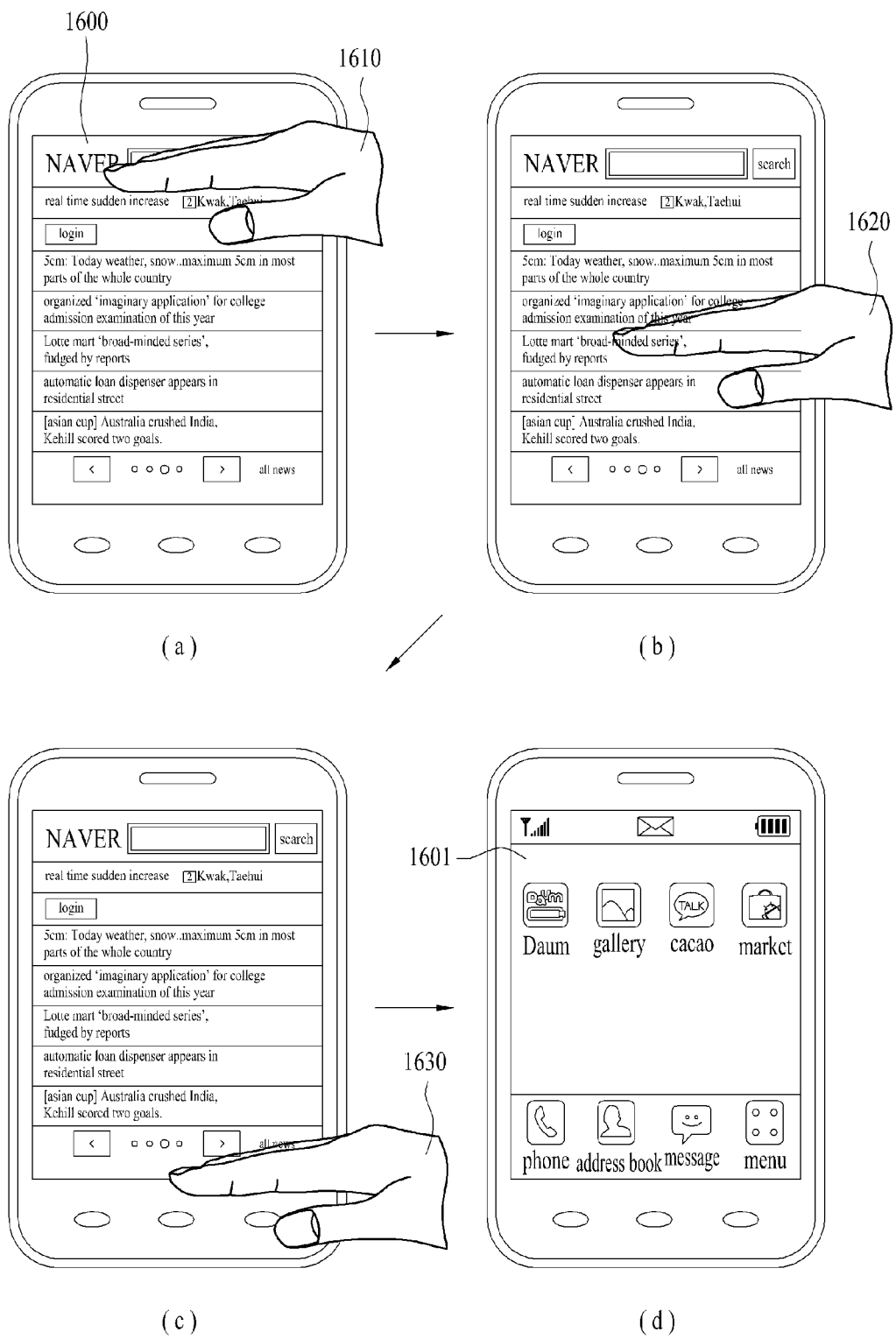
FIG. 16 is a diagram illustrating a third embodiment that implements a specific function previously stored in a memory module, on the basis of a touched area recognized by one embodiment of the present invention.

FIG. 16 is a diagram illustrating a third embodiment that implements a specific function previously stored in a memory module, on the basis of a touched area recognized by one embodiment of the present invention. The third embodiment shown in FIG. 16 may be implemented with reference to FIG. 1 to FIG. 13B. It is to be understood that the scope of the present invention is not limited to the description made in FIG. 1 to FIG. 13B.

As described above, the multimedia device according to one embodiment of the present invention may recognize that one finger has been touched on the screen. Also, the multimedia device may calculate that the touched finger has moved from the upward direction to the downward direction (1610, 1620, 1630) as shown in (a) to (d) of FIG. 16 through tracking of the touched area. Although only an end point of a finger has been recognized in the related art, an entire area of a finger may be recognized in accordance with one embodiment of the present invention.

For example, as shown in (a) of FIG. 16, if the touched finger is moved downwardly (1620) in a state that a specific application is currently implemented (1600), it is designed so as not to remove the specific application which is currently implemented, as shown in (b) of FIG. 16.

However, as shown in (c) of FIG. 16, if the finger is located at a lower portion (1630), the application which is currently implemented is stopped and switched to a home screen as shown in (d) of FIG. 16 (1601).

If design is made as above, a separate task killer application will not be required and also a complicated process for stopping implementation of an application may be omitted. Moreover, it is technically advantageous in that memory management may be performed efficiently.

Although the embodiment that implementation of the current application is removed from the upward direction to the downward direction has been described in FIG. 16, the embodiment that implementation of the current application is removed from the downward direction to the upward direction pertains to the scope of the present invention.

In FIG. 15 and FIG. 16, different functions have been implemented in accordance with the moving direction of the touched area. On the other hand, in FIG. 17 and FIG. 18, the embodiment that a specific function is implemented on the basis of direction information at the time when touch is initially made will be described. The embodiment that a specific function is implemented on the basis of position information such as for a touch area at the time when touch is initially made will be described in more detail with reference to FIG. 19.

Figure 17:
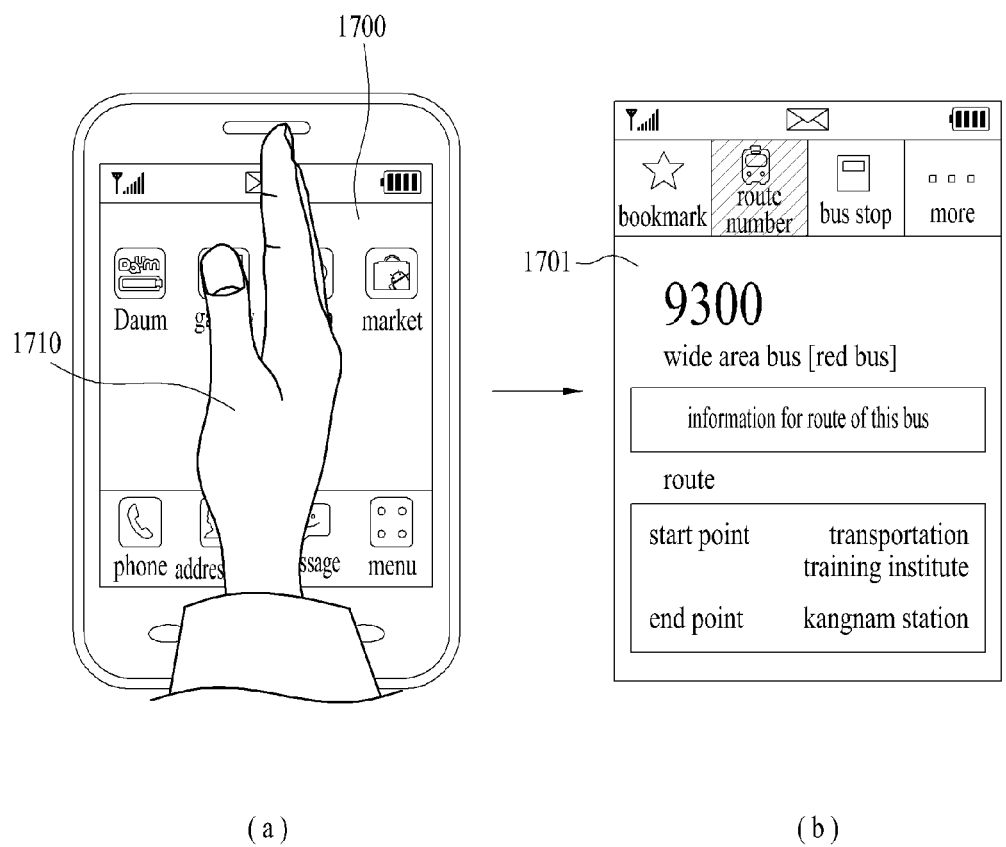
FIG. 17 is a diagram illustrating a fourth embodiment that implements a specific function previously stored in a memory module, on the basis of a touched area recognized by one embodiment of the present invention.

FIG. 17 is a diagram illustrating a fourth embodiment that implements a specific function previously stored in a memory, on the basis of a touched area recognized by one embodiment of the present invention.

First of all, as shown in (a) of FIG. 17, it is assumed that a finger 1710 of a user is maintained in a certain direction in a state of a current home screen 1700. The certain direction is not required to be perfectly orthogonal state on the basis of the bottom of the screen, and is determined to intend implementation of a shortcut function of a specific application if a previously set angle (80 degree to 100 degree) is maintained on the basis of the bottom.

Accordingly, as shown in (b) of FIG. 17, a screen 1701 where a previously set specific application is implemented is output to replace a home screen. The specific application corresponds to an application related to traffic information (ex, bus), for example.

Figure 18:
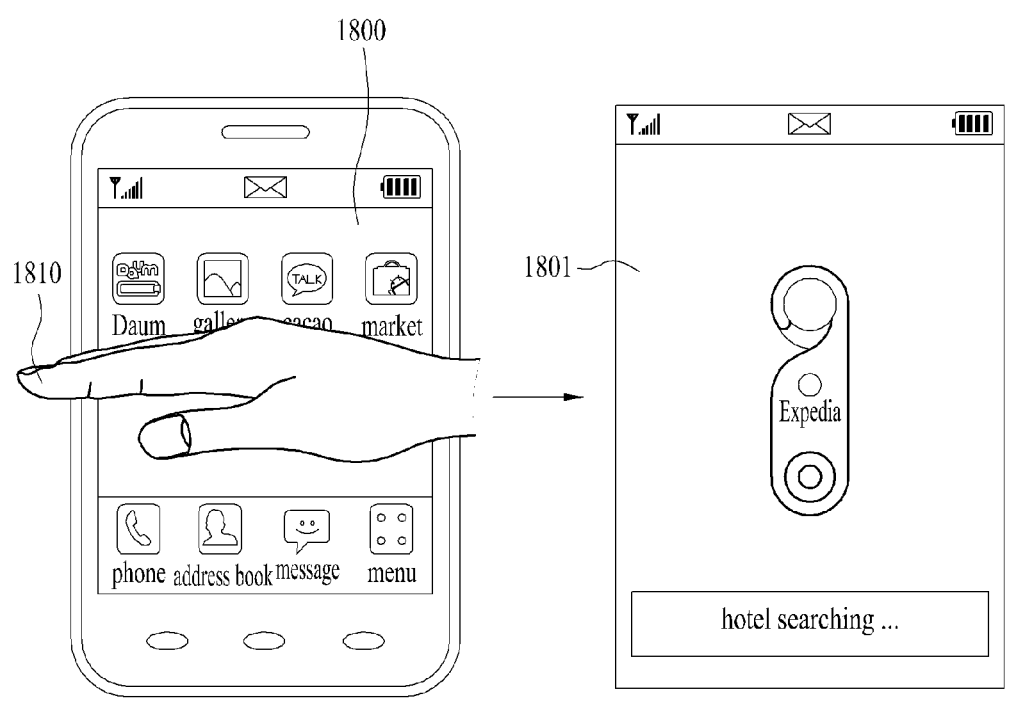
FIG. 18 is a diagram illustrating a fifth embodiment that implements a specific function previously stored in a memory module, on the basis of a touched area recognized by one embodiment of the present invention.

FIG. 18 is a diagram illustrating a fifth embodiment that implements a specific function previously stored in a memory module, on the basis of a touched area recognized by one embodiment of the present invention.

First of all, as shown in (a) of FIG. 18, it is assumed that a finger 1810 of a user is maintained in a certain direction in a state of a current home screen 1800. The certain direction is not required to be perfectly parallel state on the basis of the bottom of the screen, and is determined to intend implementation of a shortcut function of a specific application if a previously set angle (170 degree to 190 degree) is maintained on the basis of the bottom.

Accordingly, as shown in (b) of FIG. 18, a screen 1801 where a previously set specific application is implemented is output to replace a home screen. The specific application corresponds to an application related to hotel search, for example. In particular, in case of an application for searching for hotels in the periphery of the multimedia device according to one embodiment of the present invention, the multimedia device may be designed to automatically implement a GPS module within the scope of the present invention.

Figure 19:
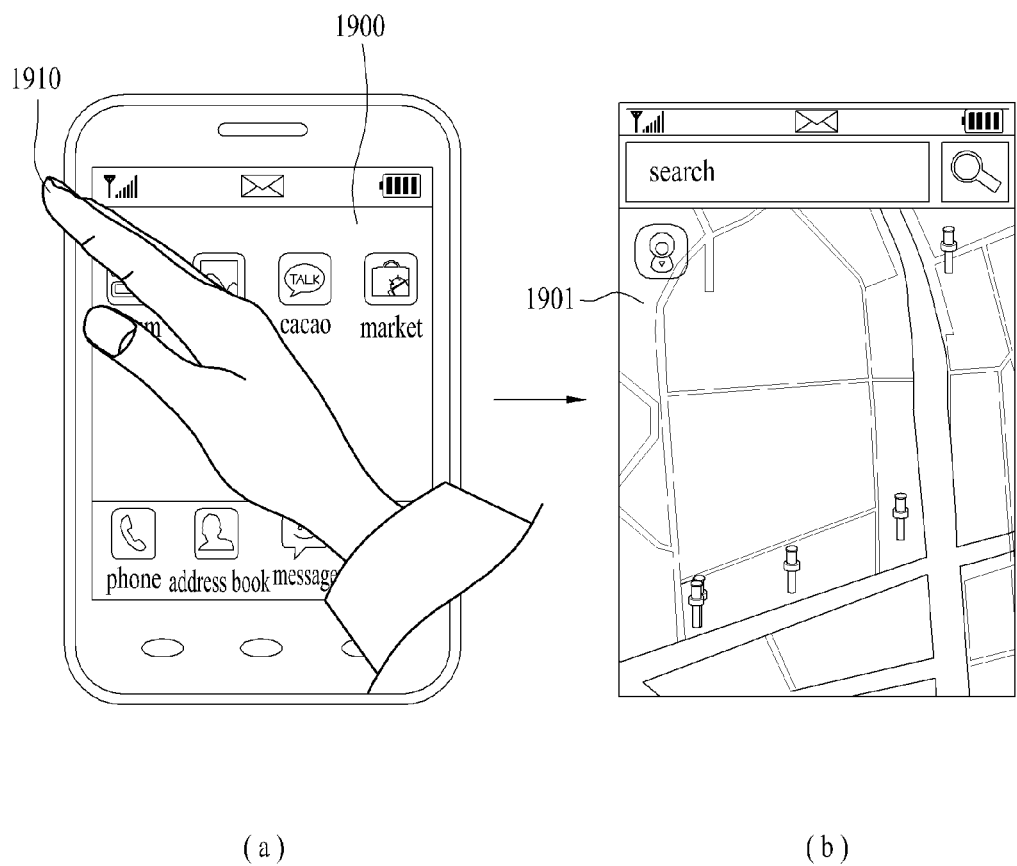
FIG. 19 is a diagram illustrating a sixth embodiment that implements a specific function previously stored in a memory module, on the basis of a touched area recognized by one embodiment of the present invention.

FIG. 19 is a diagram illustrating a sixth embodiment that implements a specific function previously stored in a memory module, on the basis of a touched area recognized by one embodiment of the present invention.

First of all, as shown in (a) of FIG. 19, it is assumed that a finger 1910 of a user is maintained in a certain direction in a state of a current home screen 1900. The certain direction is determined to intend implementation of a shortcut function of a specific application if a previously set angle (30 degree to 60 degree) is maintained on the basis of the bottom of the screen.

Accordingly, as shown in (b) of FIG. 19, a screen 1901 where a previously set specific application is implemented is output to replace a home screen. The specific application corresponds to an application related to a map service, for example. In particular, in case of an application for searching for paths in the periphery of the multimedia device according to one embodiment of the present invention, the multimedia device may be designed to automatically implement a GPS module within the scope of the present invention.

Moreover, according to another embodiment of the present invention, the multimedia device is designed to implement different functions for the same touched area in accordance with a type of a mode for implementing the multimedia device. For example, if a first touched area is recognized when the multimedia device is in a call mode, the multimedia device is designed to automatically implement a memo function. In the meantime, if the same touch as the first touched area is recognized when the multimedia device is in a memory input mode, the multimedia device may be designed to implement a function for deleting a text of the recognized touched area from the screen within the scope of the present invention.

Figure 20:
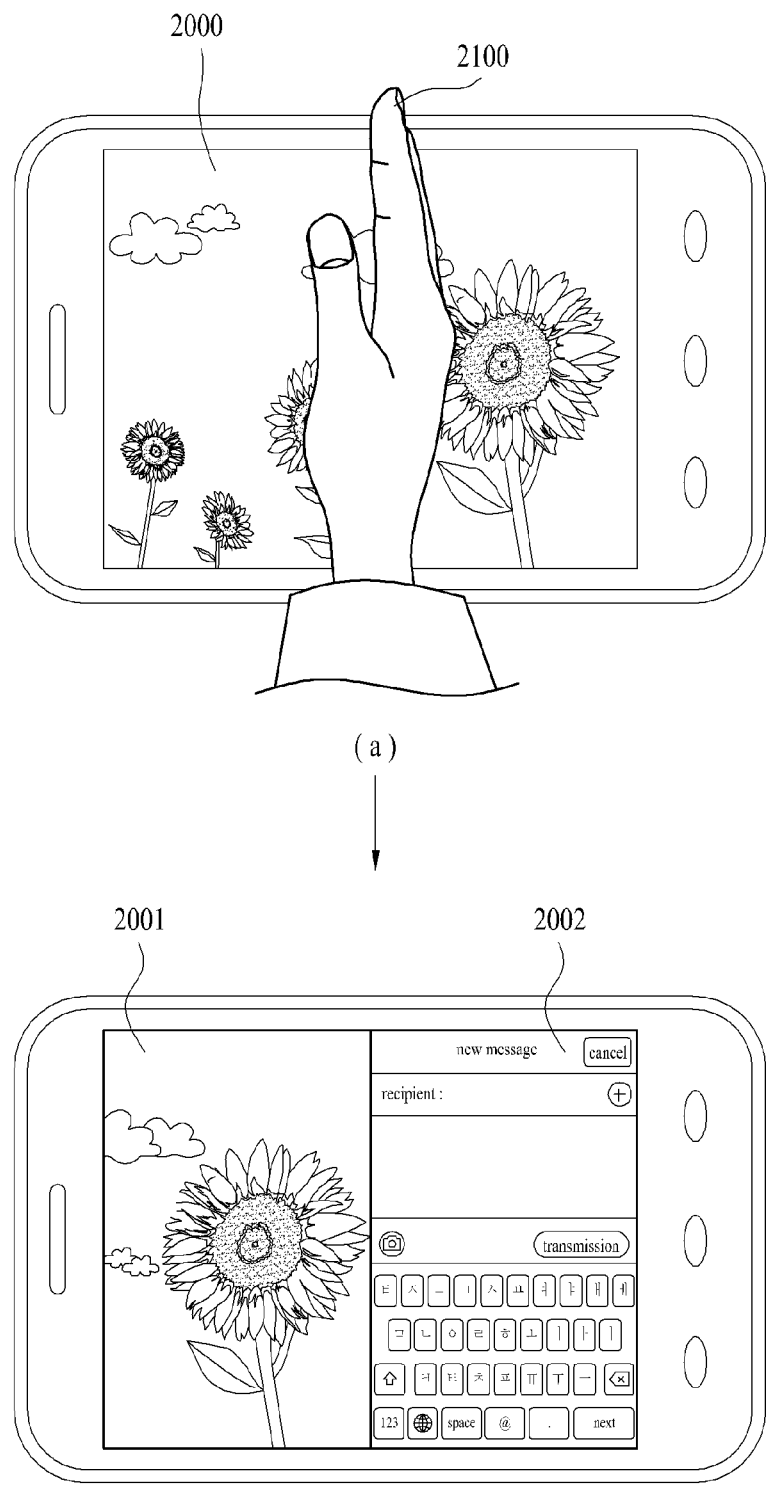
FIG. 20 is a diagram illustrating a seventh embodiment that implements a specific function previously stored in a memory module, on the basis of a touched area recognized by one embodiment of the present invention.

FIG. 20 is a diagram illustrating a seventh embodiment that implements a specific function previously stored in a memory module, on the basis of a touched area recognized by one embodiment of the present invention.

Unlike the aforementioned embodiments, the embodiment of FIG. 20 is intended to implement another embodiment by using position information as well as angle information of the touched finger.

First of all, as shown in (a) of FIG. 20, the multimedia device according to one embodiment of the present invention outputs normal video contents or broadcast data 2000. At this time, it is assumed that a finger 2010 is located at a specific position and a specific angle. In (a) of FIG. 20, the finger 2010 is orthogonal to the bottom of the screen and at the same time is touched on the position where the screen is divided into half. The position and angle may be controlled with a little differently from (a) of FIG. 20 within the scope of the present invention.

At this time, as shown in (b) of FIG. 20, video contents or broadcast data described in (a) of FIG. 20 continue to be displayed on a left area 2001 of the screen of the multimedia device, whereas a function for typing a text message is implemented on a right area 2002 of the screen.

According to the related art, when a moving picture is played, an indicator or graphic image for controlling (ex, stop, pause, volume up, volume down) the moving picture is played is displayed together with the moving picture. However, a problem may occur in that some of the screen may be covered with the indicator. A solution for the problem will be required.

By contrast, according to one embodiment of the present invention, the indicator may be removed fully and replaced with recognition of a palm or finger area. For example, if a palm or fist area is recognized, the moving picture which is currently implemented is temporarily stopped. Also, if it is recognized that the finger is moved from the upward direction to the downward direction, volume is turned up or down.

According to the aforementioned embodiments, it is advantageous in that the user may use a specific application, which is previously set by himself/herself, without stopping viewing a moving picture which is currently implemented. Also, it is advantageous in that such functions may be processed more quickly at the same time.

Figure 21:
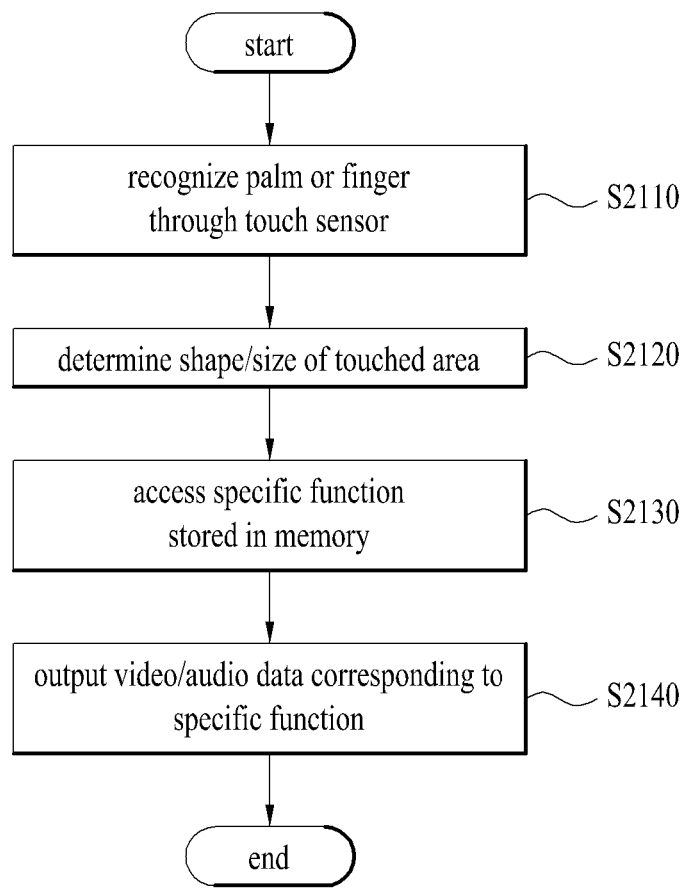
FIG. 21 is a flow chart illustrating a control method that a multimedia device recognizes a touched area in accordance with one embodiment of the present invention.

FIG. 21 is a flow chart illustrating a control method that a multimedia device recognizes a touched area in accordance with one embodiment of the present invention. FIG. 21 may be complemented with reference to FIG. 1 to FIG. 20 within the scope of the present invention.

The method for controlling the multimedia device, which includes an area based touch sensor according to one embodiment of the present invention, includes the step S2110 of recognizing at least one of a palm and a finger of the user through the touch sensor, the step S2120 of determining at least one of a shape and a size of the touched area in accordance with the recognized result of the touch sensor, the step S2130 of accessing a specific function stored in the memory module in accordance with the determined result, and the step S2140 of outputting at least one of video data and audio data corresponding to the accessed specific function.

Figure 22:
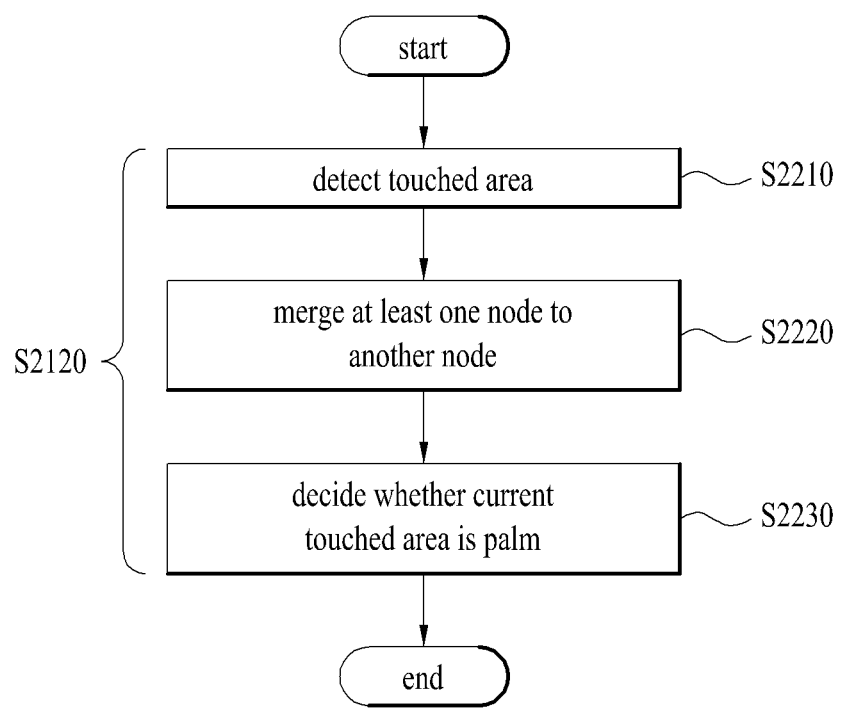
FIG. 22 is a flow chart illustrating a control method that a multimedia device recognizes a touched area in accordance with another embodiment of the present invention.

FIG. 22 is a flow chart illustrating a control method that a multimedia device recognizes a touched area in accordance with another embodiment of the present invention. Another embodiment of the step S2120 shown in FIG. 21 will be described below.

According to another embodiment of the present invention, the determining step S2120 includes the step S2210 of detecting the touched area, the step 2220 of merging at least one node within the detected area to another node, and the step S2230 of deciding whether the current touched area is a palm, on the basis of the detected touched area. Some of the steps shown in FIG. 22 may be deleted or modified within the scope of the present invention.

According to still another embodiment of the present invention, the detecting step S2210 includes the step of calculating transition in accordance with variation of values of the nodes within the touched area, and deciding a labeling value of a node of a previous column or row as a labeling value of next node on the basis of the calculated transition.

According to further still another embodiment of the present invention, the merging step S2220 includes the step of extracting the distance among three adjacent nodes (the distance between the first node and the second node will be referred to as D1, the distance between second node and the third node will be referred to as D2, and the distance between the third node and the first node will be referred to as D3) and the step of regarding the three nodes as one node if D2 is greater than D1, D2 is less than a previously set value, and D3 is greater than the previously set value.

According to further still another embodiment of the present invention, the deciding step S2230 decides the current touched area as a palm or non-palm in accordance with the relation among the node which is not touched and the other nodes.

According to further still another embodiment of the present invention, the determining step (S2120 of FIG. 21) further includes calculating the number of periods of increase or decrease on the basis of a start point of the touched point and estimating the calculated number of periods as the number of recognized fingers.

Moreover, according to further still another embodiment of the present invention, the multimedia device is designed to capture an image within a screen, which is currently output, if the current touched area is decided as a palm, and to store the captured image in the memory module. This has been described in more detail with reference to FIG. 14.

Moreover, according to further still another embodiment of the present invention, the multimedia device controls the operation to implement the first function stored in the memory module in accordance with directionality of currently touched area. This has been described in more detail with reference to FIG. 15 to FIG. 17.

According to further still another embodiment of the present invention, the multimedia device tracks variations of the area touched at the first timing and the area touched at the second timing, and controls the operation to implement the second function stored in the memory module in accordance with directionality of the variations as a result of the tracking. This has been described in more detail with reference to FIG. 15 and FIG. 16.

Moreover, the multimedia device may be designed to transmit the information on the nodes within the touched area to another device within the scope of the present invention. For example, the information on the touched area is transmitted to the second device through the screen of the first device. The function based on the touched area recognized by the first device may equally be implemented by the second device. To this end, the information on the nodes within the touched area is compressed and then transmitted.

One multimedia device, which implements the function based on the area based touch, has been illustrated in FIG. 1 to FIG. 22. In the meantime, the second embodiment that the area touch result recognized by one multimedia device is transmitted to another external multimedia device will be described in detail with reference to FIG. 23 to FIG. 37. Accordingly, the second embodiment may be complemented with reference to the embodiments described in FIG. 1 to FIG. 22 within the scope of the present invention.

Figure 23:
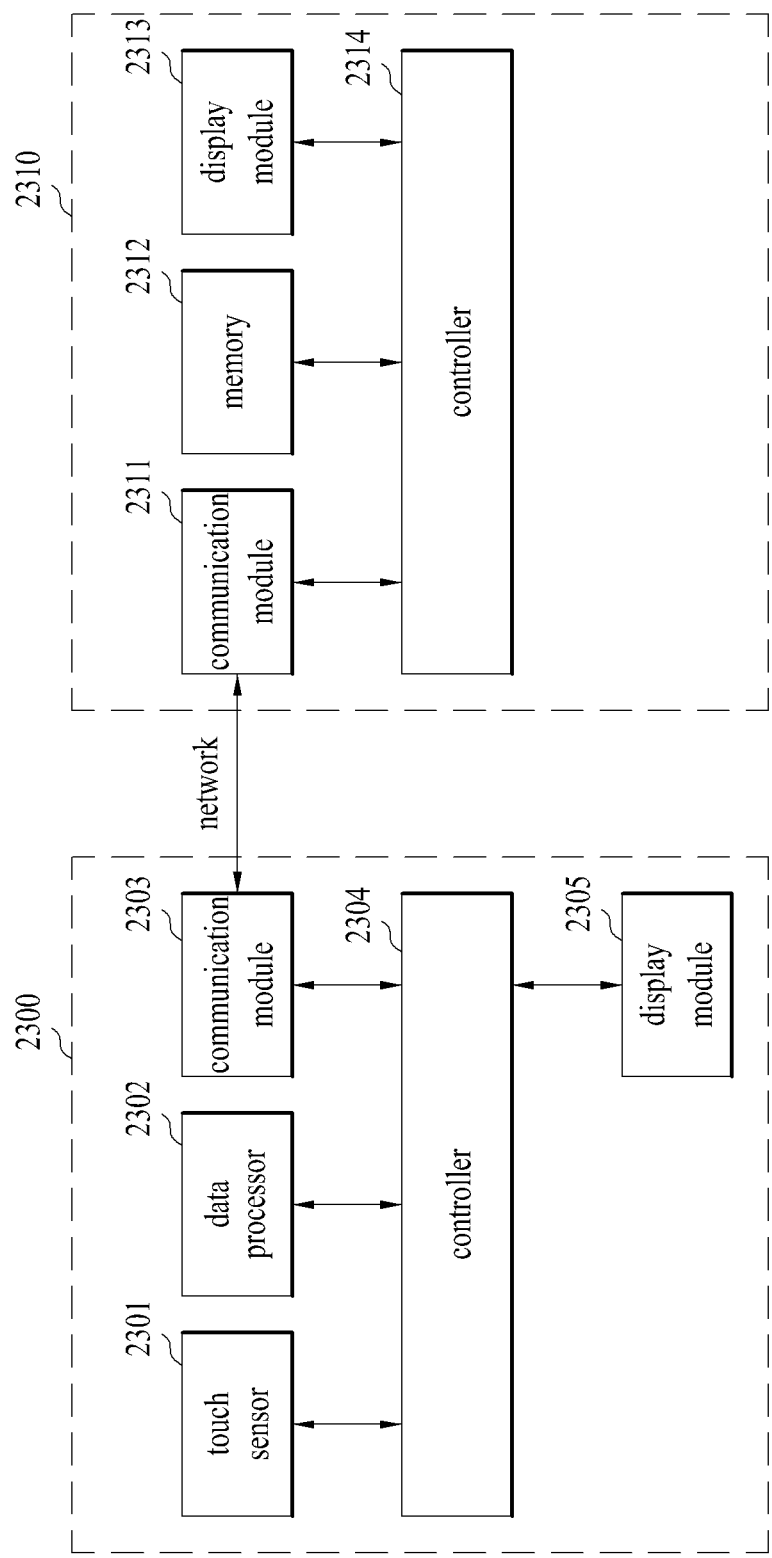
FIG. 23 is a block diagram illustrating a first multimedia device and a second multimedia device according to the second embodiment of the present invention.

FIG. 23 is a block diagram illustrating a first multimedia device and a second multimedia device according to the second embodiment of the present invention. Hereinafter, a first multimedia device 2300 provided with a touch sensor and a second multimedia device provided with a communication module will be described in more detail with reference to FIG. 23.

The first multimedia device 2300 includes a touch sensor 201, a data processor 2302, a communication module 2303, a controller 2304, and a display module 2305.

The touch sensor 2301 senses at least one touched area, and the data processor 2302 processes first information on the sensed touched area to second information to transmit the first information to an external multimedia device 2310.

The communication module 2303 is designed to transmit the processed second information to the external multimedia device 2310, and the display module 2305 is designed to output graphic data corresponding to the sensed touched area.

The data processor 2302 is designed to add time synchronization information to at least one of all the nodes of the touched area, and will be described in more detail with reference to FIG. 30.

The data processor 2302 is designed to add indexing information to at least one of all the nodes of the touched area, and will be described in more detail with reference to FIG. 27.

The at least one node corresponds to a specific node in which adjacent nodes based on the basis of the left and right direction and up and down direction are not touched, and will be described with reference to FIG. 31 and FIG. 32.

Figure 35:
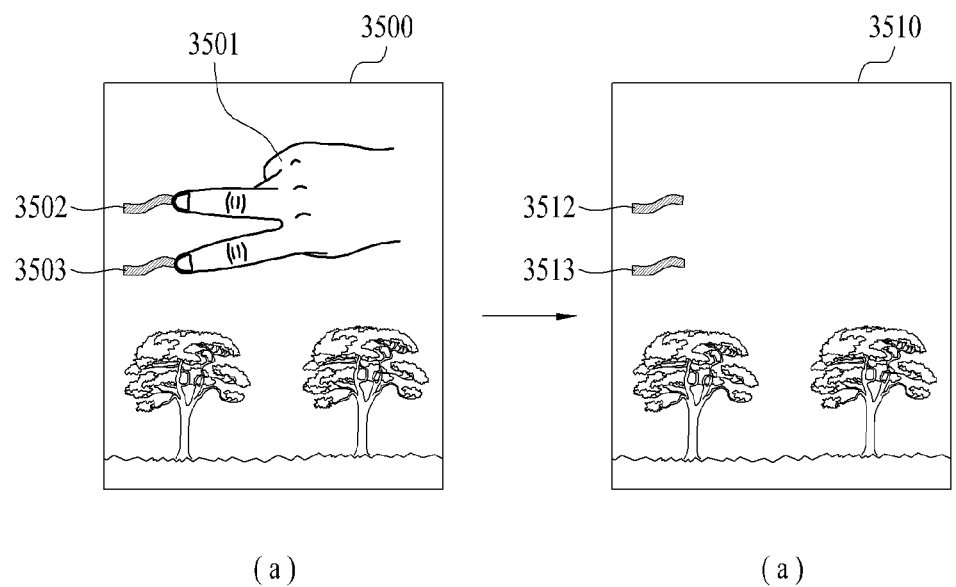
Figure 36:
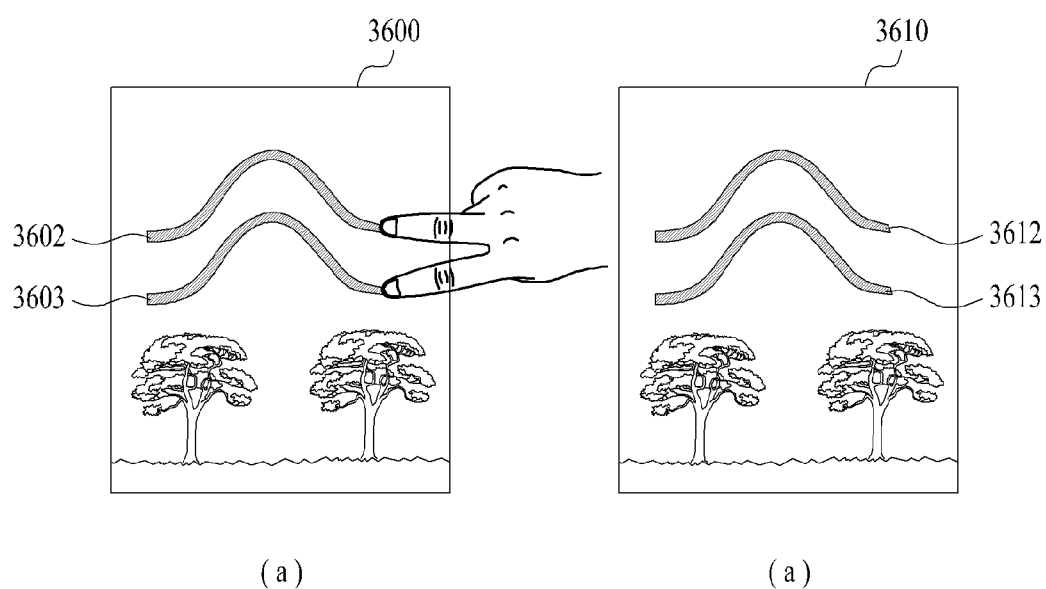

The touch sensor 2301 calculates the number of periods of increase or decrease on the basis of a start point of the touched point and estimates the calculated number of periods as the number of recognized fingers. Since the touch sensor 2301 has been described in FIG. 13, its detailed description will be omitted. Also, as shown in FIG. 35 and FIG. 36, it is advantageous in that the touched areas based on two or more fingers may be recognized at the same time.

The second multimedia device 2310 includes a communication module 2311, a memory 2312, a display module 2313, and a controller 2314. The second multimedia device 2310 serves to receive and process graphic data corresponding to the touch, wherein the graphic data are generated by the first multimedia device 2300. Accordingly, the second multimedia device 2310 may include a touch sensor, or may be designed so as not to include the touch sensor.

The memory 2312 stores data for recovering the touched area. The communication module 2311 receives first information, which indicates the touched area, from the external multimedia device 2300.

The controller 2314 recovers the received first information as second information by accessing the memory 2312, and the display module 2313 outputs graphic data corresponding to the touched area by using the recovered second information.

The memory 2312 stores corresponding position information per index, for example. This will be described in more detail with reference to FIG. 26 to FIG. 28.

The first information includes index information on a specific node, for example, and time synchronization information. The index information will be described with reference to FIG. 27, and the time synchronization information will be described with reference to FIG. 30.

The display module 2313 is designed to output the graphic data in due order by using the time synchronization information. The multimedia devices 2300 and 2310 shown in FIG. 23 correspond to mobile devices, tablet PCs, or televisions, for example.

Figure 24:
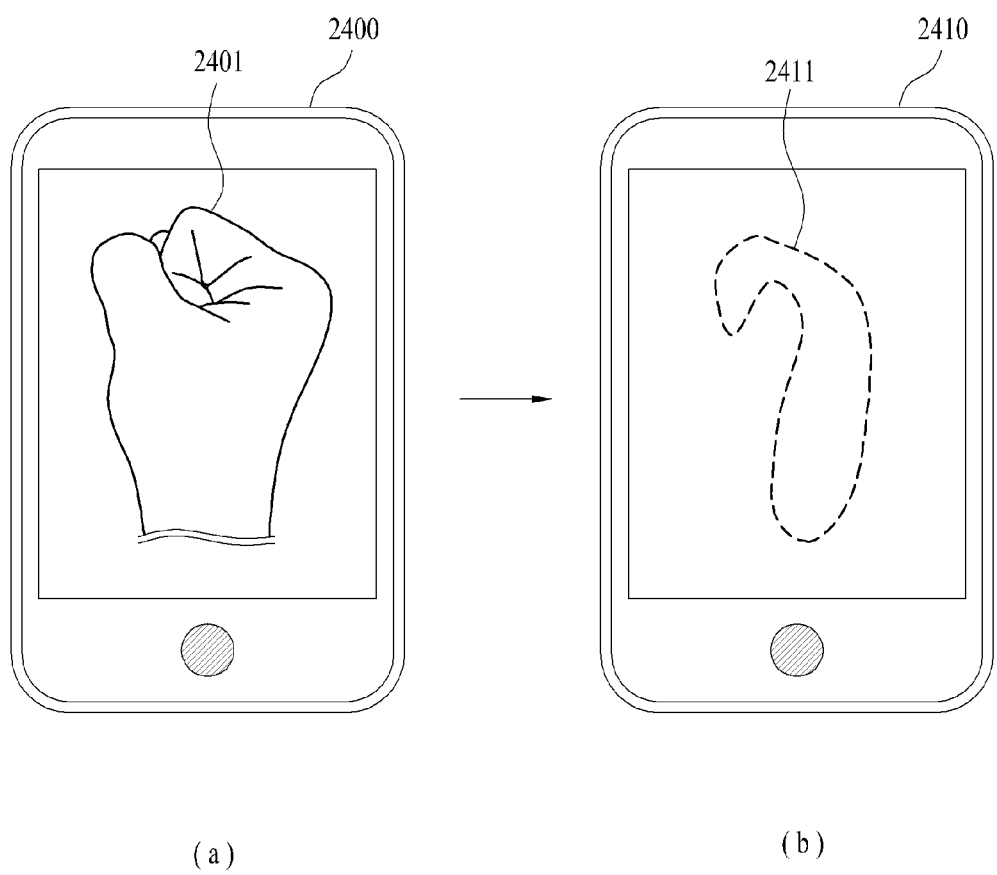
FIG. 24 is a block diagram illustrating a display result of a second multimedia device based on an area touch of a first multimedia device according to the second embodiment of the present invention.

FIG. 24 is a block diagram illustrating a display result of a second multimedia device based on an area touch of a first multimedia device according to the second embodiment of the present invention. The first multimedia device 2300 shown in FIG. 23 corresponds to the multimedia device shown in (a) of FIG. 24, and the second multimedia device 2310 shown in FIG. 23 corresponds to the multimedia device shown in (b) of FIG. 24.

First of all, as shown in (a) of FIG. 24, it is assumed that a hand 2401 of the user is touched with the screen of the multimedia device 2400 according to the second embodiment of the present invention. The multimedia device 2410, which performs data communication with the multimedia device 2400 through wire or wireless, displays an area 2411 corresponding to a shape of the hand 2401 as shown in (b) of FIG. 24. Accordingly, it is advantageous in that if the user who uses the first mobile device touches the first mobile device with his/her palm or fist, a corresponding graphic is also displayed in the second mobile device. However, detailed solutions for improving efficiency in data processing and transmission will be described with reference to FIG. 25 to FIG. 32.

FIG. 25 to FIG. 29 are diagrams sequentially illustrating detailed processes for implementing FIG. 24.

Figure 25:
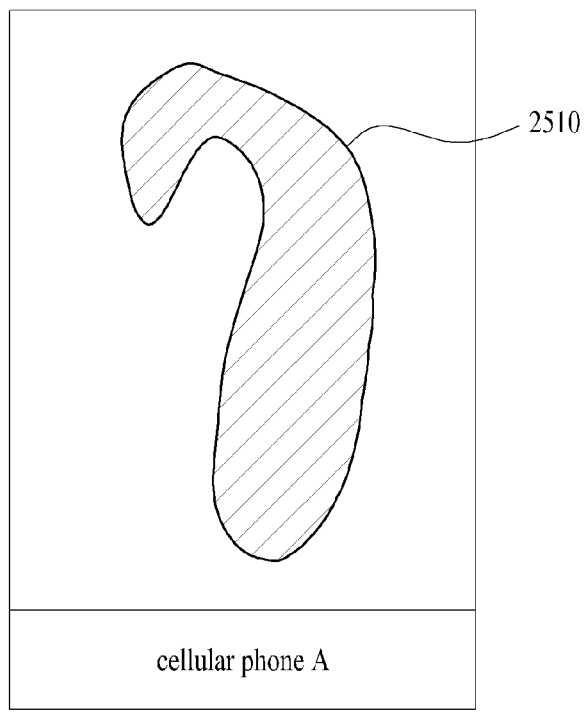
Figure 26:
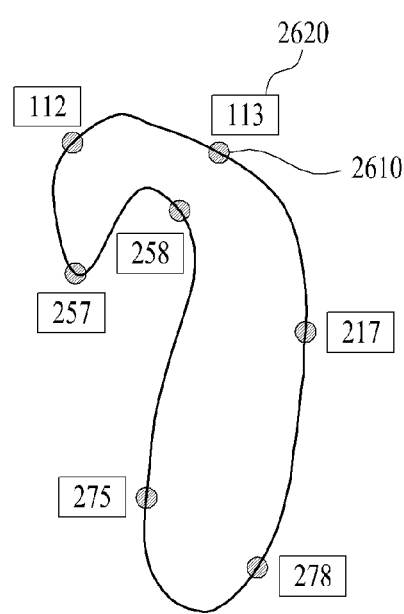
Figure 28:
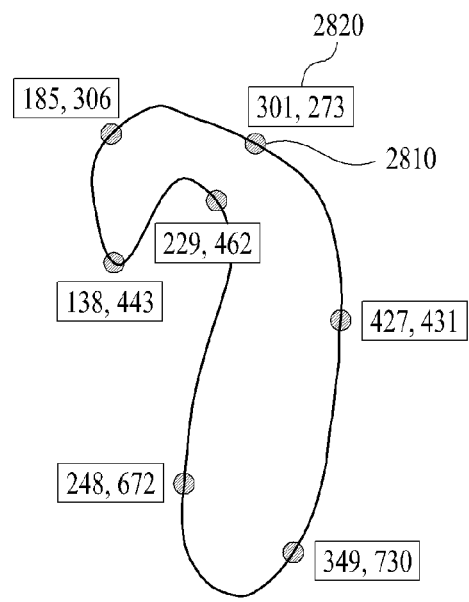
Figure 29:
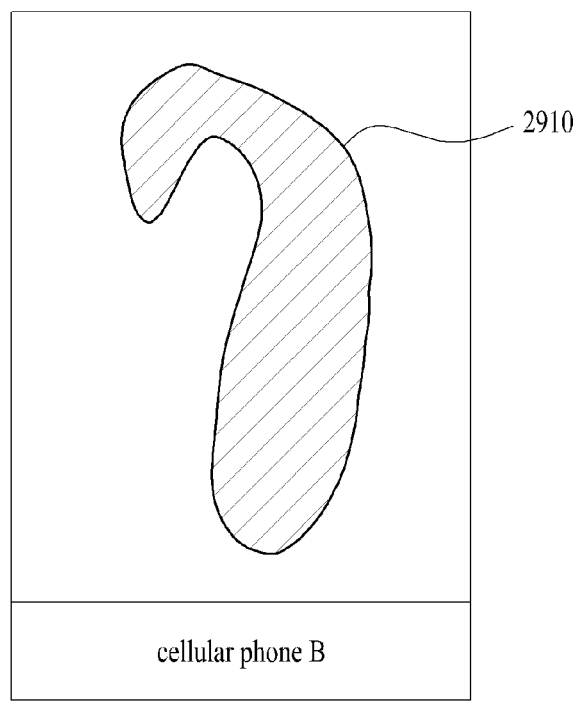

First of all, FIG. 25 and FIG. 26 relate to a device that directly receives a touch input from a user, and FIG. 28 and FIG. 29 relate to the other party device that recovers FIG. 25 and FIG. 26. FIG. 27 illustrates an example of an index table used to minimize data capacity based on area touch.

It is assumed that a cellular phone A illustrated in FIG. 25 and a cellular phone B illustrated in FIG. 29 are connected with each other through at least one communication protocol. In more detail, the cellular phone A and the cellular phone B are connected with each other through WiFi or share the screen through the mirroring technology. However, according to the related art, a solution for varying a display of the cellular phone B (FIG. 29) in real time in accordance with variation of the touched area of the cellular phone A shown in FIG. 25 has not been developed. In particular, the second embodiment of the present invention suggests a method for sharing variation of a display based on a touched area in real time and improving efficiency in data transmission.

If the cellular phone A shown in FIG. 25 is touched with a hand or fist 2510, index information 2620 is added a specific node 2610 as shown in FIG. 26. In the meantime, a method for recognizing an area not a dot or line through a touch has been described as above. The specific node will be described with reference to FIG. 31 and FIG. 32. Moreover, the multimedia device at the transmitting side is designed to transmit index information only and the multimedia device at the receiving side is designed to recover the corresponding position by using the index information, whereby transmission data of high capacity based on area touch may be reduced relatively.

Accordingly, as shown in FIG. 27, position information (X coordinate value, Y coordinate value) per index is mapped, and it is designed that a table shown in FIG. 27 is stored even in the memory of the mobile device at the receiving side as well as the mobile device at the transmitting side.

The multimedia device at the receiving side may recover a coordinate value 2820 corresponding to each index 2810 with reference to the table shown in FIG. 27 by receiving the index information transmitted in FIG. 26. The recovered coordinate value is illustrated in FIG. 28.

Accordingly, through recovery of the coordinate value shown in FIG. 28, the other party cellular phone B displays a certain area 2910 as shown in FIG. 29. The area 2910 is almost the same as a touched area 2510 shown in FIG. 25. In case of this design, it is advantageous in that the other party cellular phone B may identify a picture (ex, area touch) drawn by the user who uses the cellular phone A, in real time.

FIG. 30 is a diagram illustrating data transmitted between a first multimedia device and a second multimedia device according to the second embodiment of the present invention.

Unlike the related art, the present invention is designed to transmit area based touch related data as well as finger touch related data. Also, a data structure of FIG. 30 has technical effects in view of two aspects.

First of all, as time information is added to area based touch data as well as finger touch data, a graphic based on finger touch and a graphic based on area based touch are displayed at the same time or at an interval of given time difference.

Moreover, it may be designed that the index shown in FIG. 27 is additionally defined in a value shown in FIG. 30, within the scope of the present invention. Accordingly, it is advantageous in that the amount of data transmitted from the multimedia device at the transmitting side to the multimedia device at the receiving side may be minimized.

Figure 31:
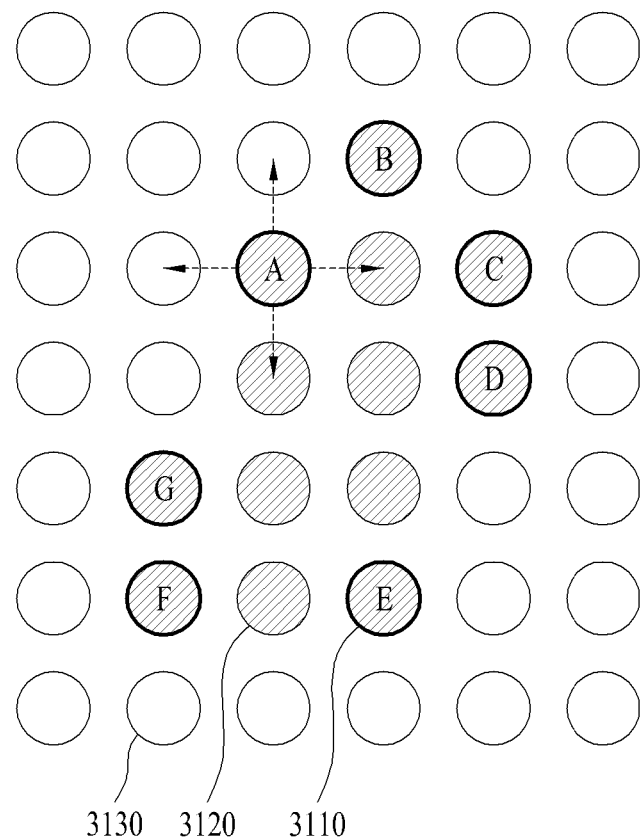
FIG. 31 and FIG. 32 are diagrams illustrating a mechanism for determining a touched area in accordance with the second embodiment of the present invention.
Figure 32:
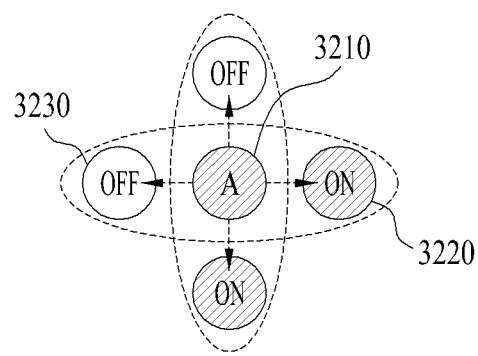

FIG. 31 and FIG. 32 are diagrams illustrating a mechanism for deciding a touched area in accordance with the second embodiment of the present invention.

As described with reference to FIG. 26, in one aspect of the present invention, information on all the nodes of the touched area is not transmitted, and an index is added to a specific node. Moreover, an example of a solution for deciding a specific node will be described with reference to FIG. 31 and FIG. 32.

First of all, as shown in FIG. 31, an entire screen of the multimedia device may be divided into parts in a unit of node (3130). At this time, nodes 3120 and 3110 that display the area touched by the user are displayed differently the nodes 3130 which are not touched by the user.

In the meantime, as shown in FIG. 26, a method for identifying a specific node 3110 adding index from another node 3120 will be described with reference to FIG. 32 on the basis of node A.

In other words, a portion enlarged around the node A in FIG. 31 corresponds to FIG. 32.

For example, the node A 3210 corresponds to a specific node that adds index. This is because that one of adjacent left and right nodes 3220 and 3230 based on the node A 3210 is in an off state (point which is not touched) and at the same time one of adjacent up and down nodes is in an off state.

FIG. 33 to FIG. 36 are diagrams illustrating screens of first multimedia device and a second multimedia device, which are varied in accordance with the second embodiment of the present invention.

Figure 33:
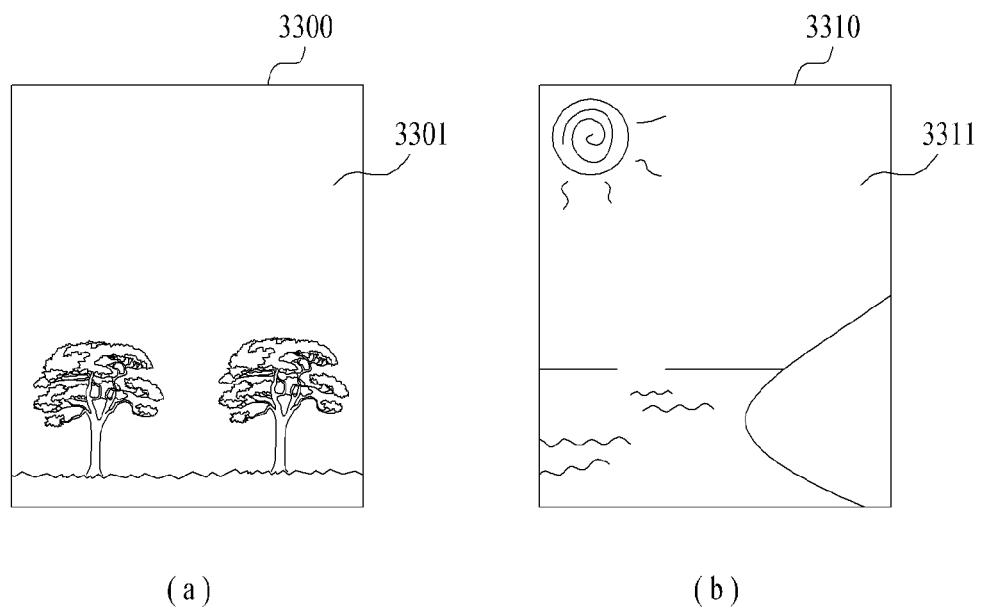
FIG. 33 to FIG. 36 are diagrams illustrating screens of first multimedia device and a second multimedia device, which are varied in accordance with the second embodiment of the present invention.
Figure 34:
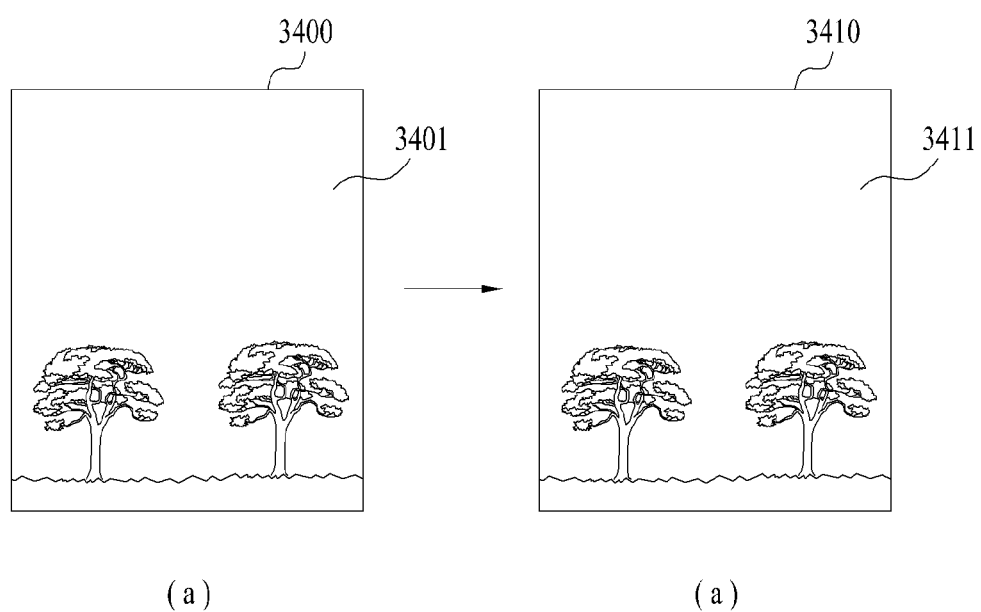

First of all, (a) of FIG. 33, (a) of FIG. 34, (a) of FIG. 35, and (a) of FIG. 36 include a touch sensor, and correspond to the first multimedia device that transmits area based touch related data. In the mean time, (b) of FIG. 33, (b) of FIG. 34, (b) of FIG. 35, and (b) of FIG. 36 correspond to the first multimedia device that receives area based touch related data. Also, the present invention may be designed to display FIG. 33 to FIG. 36 in due order.

As shown in (a) of FIG. 33, the first multimedia device 3300 outputs a GUI 3301 corresponding to a function which is currently implemented. At this time, as shown in (b) of FIG. 33, the second multimedia device 3310 displays a GUI 3311 different from the GUI 3301.

In this case, if the first multimedia device and the second multimedia device are connected with each other through wire or wireless communication, as shown in (a) of FIG. 34 and (b) of FIG. 34, the GUI 3401 output by the first multimedia device 3400 is the same as the GUI 3411 output by the second multimedia device.

Moreover, as shown in (a) of FIG. 35, if a touch is made using two fingers of a user 3501, the first multimedia device 3500 displays GUIs 3502 and 3503 corresponding to two areas. Also, the second multimedia device 3510, which is the other party device and is remotely away from the first multimedia device 3500, equally displays GUIs 3512 and 3513 corresponding to user touch of the first multimedia device 3500 as shown in (b) of FIG. 35.

Also, as shown in (a) of FIG. 36, if a touch is made continuously in a certain direction for a certain time using two fingers of a user 3601, the first multimedia device 3600 displays GUIs 3602 and 3603 corresponding to two areas. Also, the second multimedia device 3610, which is the other party device and is remotely away from the first multimedia device 3600, equally displays GUIs 3612 and 3613 corresponding to user touch of the first multimedia device 3600 as shown in (b) of FIG. 36.

In particular, it is technically advantageous in that the amount of data transmitted from the aforementioned drawing (a) (multimedia device at the transmitting side) to the aforementioned drawing (b) (multimedia device at the receiving side) is reduced (see FIG. 27, FIG. 30, FIG. 31, and FIG. 32).

FIG. 37 is a flow chart illustrating a method for controlling a first multimedia device and a second multimedia device in accordance with the second embodiment of the present invention.

The first multimedia device 3700, which includes a touch sensor, senses at least one touched area (S3701), and processes first information on the sensed touched area to second information to transmit the information to an external multimedia device (S3702).

The first multimedia device 3700 transmits the processed second information to the external multimedia device (second multimedia device 3710).

The first multimedia device 3700 outputs graphic data corresponding to the sensed touched area. For example, a screen corresponding to (a) of FIG. 36 or FIG. 35 is output.

The step S3702 according to another embodiment of the present invention adds time synchronization information to at least one of all the nodes of the touched area.

And, the step S3702 according to still another embodiment of the present invention is designed to add indexing information to at least one of all the nodes of the touched area. The at least one node corresponds to a specific node in which adjacent nodes based on the left and right direction and up and down direction are not touched.

The step S3701 further includes calculating the number of periods of increase or decrease on the basis of a start point of the touched point and estimating the calculated number of periods as the number of recognized fingers.

The second multimedia device 3710, which includes a communication module, receives first information, which indicates the touched area, from the external multimedia device 3700 (S3711).

The second multimedia device 3710 recovers the received first information to second information by accessing the memory (S3712), and outputs graphic data corresponding to the touched area by using the recovered second information (S3713). For example, the screen corresponding to (b) of FIG. 36 or FIG. 35 is output.

The memory stores corresponding position information per index, for example. This has been described with reference to FIG. 27.

The first information includes index information on a specific node, for example, and time synchronization information. This information has been described with reference to FIG. 30.

The step S3713 is designed to output the graphic data in due order by using the time synchronization information, for example.

The device and the method for controlling the same according to one embodiment of the present invention may be implemented by combination of the aforementioned drawings, or the embodiments apparent to those skilled in the art may be incorporated to achieve a new embodiment within the scope of the present invention.

In the meantime, the method for operating the device according to the present invention may be implemented in a recording medium, which may be read by a processor provided in an electronic device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a multimedia device, which includes an area based touch sensor, the method comprising the steps of:

performing at least one mode in the multimedia device;

recognizing at least a palm or a finger of a user through a touch sensor;

determining at least a shape, a size or a number of fingers of a touched area in accordance with the recognized result of the touch sensor;

accessing a specific function stored in a memory module in accordance with the determined result and a type of the at least one mode;

outputting at least video data or audio data corresponding to the accessed specific function, wherein the determining step further includes merging at least one node within a detected area to another node, wherein the merging step further includes extracting a distance between three adjacent nodes (a distance between a first node and a second node is D1, a distance between the second node and a third node is D2, and a distance between the third node and the first node is D3) and estimating the three nodes to be one node if D2 is greater than D1, D2 is less than a previously set value, and D3 is greater than the previously set value, wherein the determining the number of fingers further includes if an edge point of the touched area becomes farther away in a counterclockwise direction from a start point, firstly estimating it to be a positive value or a negative value, wherein the start point is decided by a minimum Y position value and a maximum X position value at the minimum Y position of the touched area, if the edge point of the touched area becomes closer to the start point in the same counterclockwise direction, secondly estimating it to be a negative value or a positive value opposite to the firstly estimated value, estimating an interval where positive numbers and negative numbers are repeated to be one period, and estimating the number of fingers within the touched area to be a number of periods.

2. The method according to claim 1, further comprising the step of performing a control operation to implement a first function stored in the memory module in accordance with directionality of the current touched area.

3. The method according to claim 2, further comprising the steps of tracking variations of an area touched at a first timing and an area touched at a second timing, and controlling an operation to implement a second function stored in the memory module in accordance with directionality of the variations as a result of the tracking.

4. The method according to claim 1, wherein the specific function is changed depending on the type of the at least one mode even though the touched area is unchanged.

5. The method according to claim 1, wherein the multimedia device performs a memo function if a first touched area is recognized during a call mode of the multimedia device, and the multimedia device performs a function for deleting a text of the recognized touched area during a memo input mode.

6. A multimedia device, the multimedia device comprising:
a touch sensor configured to recognize at least a palm or a finger of a user;
a controller configured to determine at least a shape, a size or a number of fingers of a touched area in accordance with the recognized result of the touch sensor;
a memory configured to store a first function corresponding to a first touch pattern and a second function corresponding to a second touch pattern;
a memory controller configured to access a specific function stored in the memory module in accordance with the determined result of the controller and a type of at least one mode in the multimedia device;
an output module configured to output at least video data or audio data corresponding to the accessed specific function, wherein the controller is configured to detect the touched area, and merge at least one node within the detected area to another node, and wherein the controller is further configured to extract a distance between three adjacent nodes (a distance between a first node and a second node is D1, a distance between the second node and a third node is D2, and a distance between the third node and the first node is D3) and estimate the three nodes to be one node if D2 is greater than D1, D2 is less than a previously set value, and D3 is greater than the previously set value, if at least one of a consecutive edge point of the touched area becomes farther away in a counterclockwise direction from a start point, the controller is further configured to firstly estimate it to be a positive value or a negative value, wherein the start point is decided by a minimum Y position value and a maximum X position value at the minimum Y position of the touched area, if at least one of a consecutive edge point of the touched area becomes closer to the start point in the same counterclockwise direction, the controller is further configured to secondly estimate it to be a negative value or a positive value opposite to the firstly estimated value, wherein the controller is further configured to estimate an interval where positive numbers and negative numbers are repeated to be one period, and wherein the controller is further configured to estimate the number of fingers within the touched area as a number of periods.

7. The multimedia device according to claim 6, wherein the controller performs a control operation to implement the first function stored in the memory module in accordance with directionality of the current touched area.

8. The multimedia device according to claim 7, wherein the controller tracks variations of an area touched at a first timing and an area touched at a second timing, and controls an operation to implement a second function stored in the memory module in accordance with directionality of the variations as a result of the tracking.

9. The multimedia device according to claim 6, wherein the specific function is changed depending on the type of the at least one mode even though the touched area is unchanged.

10. The multimedia device according to claim 9, wherein the multimedia device perform a memo function if a first touched area is recognized during a call mode of the multimedia device, further the multimedia device performs a function for deleting a text of the recognized touched area during a memo input mode.

* * * * *